US012717219B2

(12) United States Patent
Morikuni

(10) Patent No.: US 12,717,219 B2
(45) Date of Patent: Aug. 25, 2026

(54) VARIABLE LENS, VARIABLE LENS UNIT, OPTICAL SYSTEM, PROJECTOR AND IMAGING APPARATUS

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 278 days.

(21) Appl. No.: 18/600,361

(22) Filed: Mar. 8, 2024

(65) Prior Publication Data

US 2024/0302725 A1 Sep. 12, 2024

(30) Foreign Application Priority Data

Mar. 10, 2023 (JP) ................................ 2023-037311

(51) Int. Cl.
*G03B 21/14* (2006.01)
*G02B 3/02* (2006.01)
*G02B 3/14* (2006.01)

(52) U.S. Cl.
CPC ............. *G03B 21/142* (2013.01); *G02B 3/02* (2013.01); *G02B 3/14* (2013.01)

(58) Field of Classification Search
CPC ........... G03B 21/142; G02B 3/02; G02B 3/14
See application file for complete search history.

(56) References Cited

U.S. PATENT DOCUMENTS 6,344,930 B1 * 2/2002 Kaneko .................. G02B 30/52 359/666
10,677,966 B1 * 6/2020 Ouderkirk .......... G02B 27/4272
2009/0263040 A1 * 10/2009 Rolland ............... A61B 5/0066 382/255
2014/0092388 A1 * 4/2014 Lee ...................... A61B 1/0019 359/201.1
2014/0333906 A1 * 11/2014 Hirono ................. H04N 9/3173 353/31

(Continued)

FOREIGN PATENT DOCUMENTS

CN 109324388 A * 2/2019 ............... G02B 9/34
CN 118363235 A * 7/2024 ............... G02B 3/14

(Continued)

OTHER PUBLICATIONS

Wang et al., "Paraxial ray solution for liquid-filled variable focus lenses," Japanese Journal of Applied Physics, 2017, vol. 56, 122501, pp. 1-7.

*Primary Examiner* — John R Schnurr
(74) *Attorney, Agent, or Firm* — Oliff PLC

(57) ABSTRACT

A variable lens includes a first substrate that is light transmissive, a first liquid, a movable film that is in contact with the first liquid and is light transmissive and elastically deformable, a second liquid that is in contact with the movable film, and a second substrate that is light transmissive, the components described above sequentially arranged in the direction in which the beam passes along the optical axis. The first and second liquids differ from each other in terms of refractive index. In the variable lens, the pressures of the first and second liquids are adjusted to cause the movable film to curve in the direction along the optical axis. At least one of the first and second substrates has power as a lens.

10 Claims, 24 Drawing Sheets

(56) References Cited

U.S. PATENT DOCUMENTS

| | | | | |
|---|---|---|---|---|
| 2015/0358531 | A1* | 12/2015 | Xu | G02B 3/0081 348/345 |
| 2016/0178992 | A1* | 6/2016 | Schneider | G02B 3/0081 362/18 |
| 2018/0173088 | A1* | 6/2018 | Minefuji | G02B 13/16 |
| 2019/0025575 | A1* | 1/2019 | Wai | G02B 3/12 |
| 2019/0033604 | A1* | 1/2019 | Chen | G02B 1/041 |
| 2021/0157037 | A1* | 5/2021 | Iveland | G02B 3/14 |
| 2021/0157124 | A1* | 5/2021 | Langenbacher | G02B 26/005 |
| 2021/0206693 | A1* | 7/2021 | Gaj | C03C 19/00 |
| 2021/0309564 | A1* | 10/2021 | Drake | C03C 8/14 |
| 2022/0057546 | A1* | 2/2022 | Dale | G02B 26/005 |
| 2022/0057616 | A1* | 2/2022 | Hackemer | G02B 3/14 |
| 2023/0124449 | A1* | 4/2023 | Anduran | G02B 26/005 359/315 |
| 2025/0142216 | A1* | 5/2025 | Xu | H04N 23/611 |

FOREIGN PATENT DOCUMENTS

| | | | | |
|---|---|---|---|---|
| DE | 102017218503 A1 | * | 4/2018 | G06T 7/521 |
| JP | 2011158595 A | * | 8/2011 | |
| WO | WO-2025191957 A1 | * | 9/2025 | H04N 5/74 |

* cited by examiner 100
1
11
12
P
13
M
5
6
4
3
2
N 12
13
L9
L8
L7
L6
L5
L21
M
L4
L3
5
6
2
L2
L1
354
351
353
37
352
355
36
33
314
311
313
35
30B
34
315
312
32
31
30A
N

*FIG. 5*

LONG DISTANCE

STANDARD DISTANCE

SHORT DISTANCE

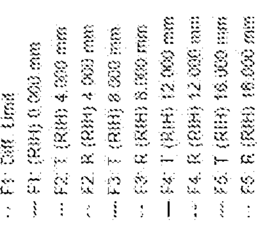
FIG. 6
Diffraction MTF
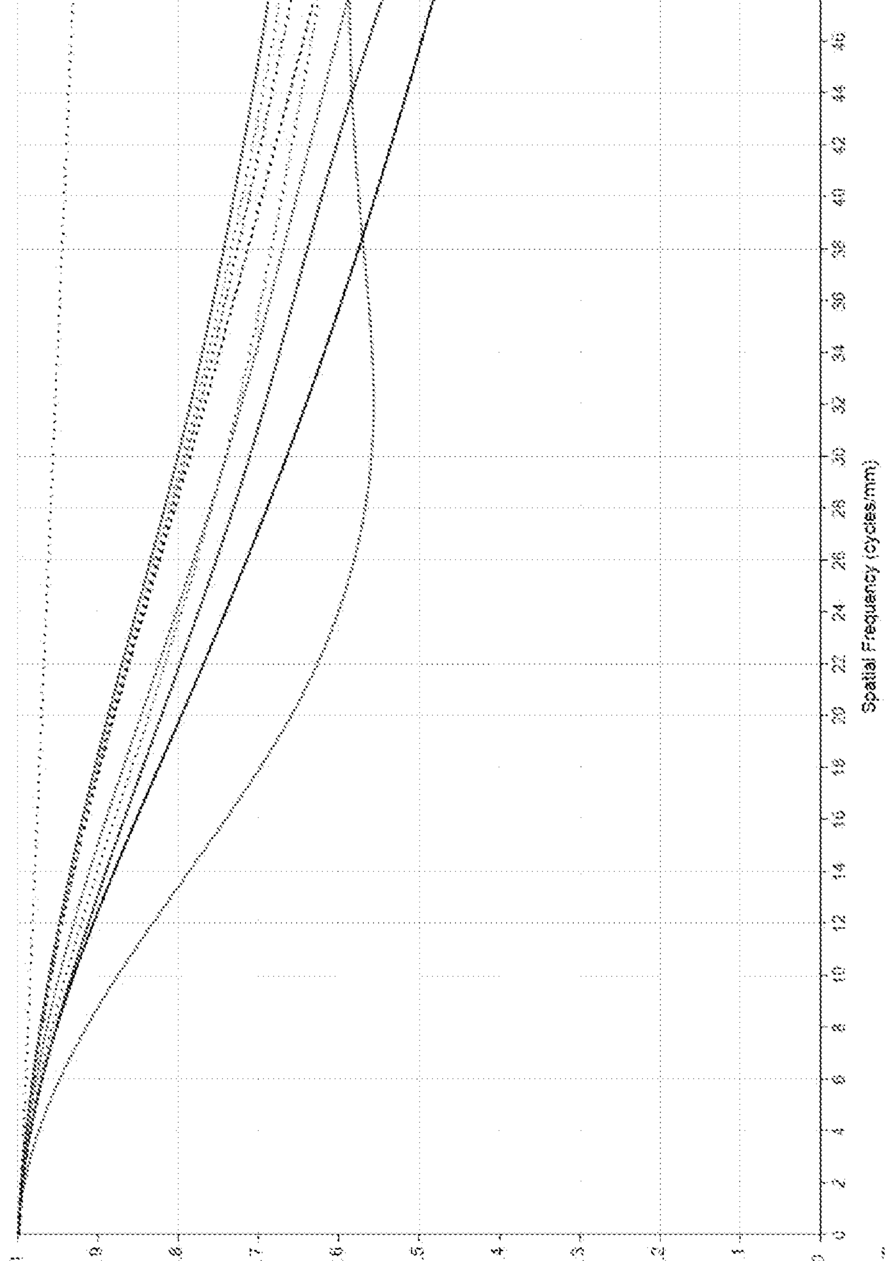
Modulation
Spatial Frequency (cycles/mm)

FIG. 10

LONG DISTANCE

STANDARD DISTANCE

SHORT DISTANCE

Diffraction MTF
Far

LONG DISTANCE

STANDARD DISTANCE

SHORT DISTANCE 2 3 4 N 31 32 33 34 35 36 37 41 42 43 44 313 314 353 354 30A 30B L1 L2

Diffraction MTF

FIG. 17
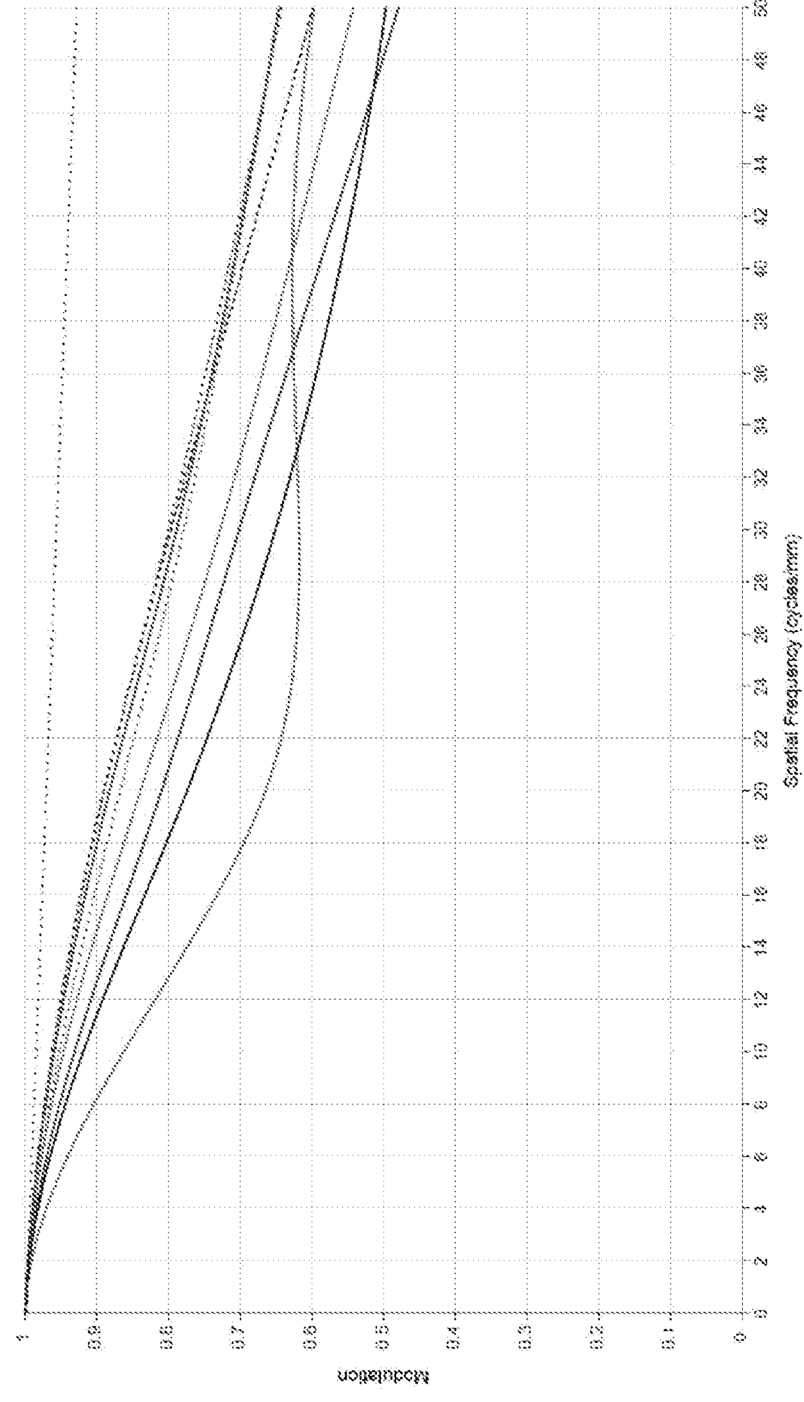

Diffraction MTF
Far

LONG DISTANCE
STANDARD DISTANCE
SHORT DISTANCE
2
3
4
31
32
33
34
35
36
37
41
42
43
44
313
314
353
354
30A
30B
L1
L2
N

Diffraction MTF
F1: Diff. Limit
F1: (RIH) 0.000 mm
F2: T (RIH) 4.000 mm
F2: R (RIH) 4.000 mm
F3: T (RIH) 8.000 mm
F3: R (RIH) 8.000 mm
F4: T (RIH) 12.000 mm
F4: R (RIH) 12.000 mm
F5: T (RIH) 16.000 mm
F5: R (RIH) 16.000 mm
Modulation
1
0.9
0.8
0.7
0.6
0.5
0.4
0.3
0.2
0.1
0
Spatial Frequency (cycles/mm)
0
2
4
6
8
10
12
14
16
18
20
22
24
26
28
30
32
34
36
38
40
42
44
46
48
50

Diffraction MTF
Far 200
7
P
M
5
6
4
3
2
N

VARIABLE LENS, VARIABLE LENS UNIT, OPTICAL SYSTEM, PROJECTOR AND IMAGING APPARATUS

The present application is based on, and claims priority from JP Application Serial Number 2023-037311, filed Mar. 10, 2023, the disclosure of which is hereby incorporated by reference herein in its entirety.

BACKGROUND

1. Technical Field

The present disclosure relates to a variable lens, a variable lens unit, an optical system, projector and an imaging apparatus.

2. Related Art

A variable lens or a focal-length-variable lens is described in Lihui Wang, Hiromasa Oku, and Masatoshi Ishikawa, "Paraxial ray solution for liquid-filled variable focus lenses", Japanese Journal of Applied Physics 56, 122501 (2017). The variable lens described in the aforementioned literature includes a first member that is light transmissive, a first liquid, a transparent, elastically deformable movable film, a second liquid, and a second member that is light transmissive, the components described above sequentially arranged in the direction in which the beam travels along the optical axis. The first and second members are each a planar plate member that does not have power as a lens. The first liquid fills the space between the first member and the movable film. The second liquid fills the space between the movable film and the second member. The first and second liquids differ from each other in terms of refractive index. The focal length of the variable lens can be changed by adjusting the pressures of the first and second liquids to curve the movable film in the direction along the optical axis.

Lihui Wang, Hiromasa Oku, and Masatoshi Ishikawa, "Paraxial ray solution for liquid-filled variable focus lenses", Japanese Journal of Applied Physics 56, 122501 (2017) is an example of the related art.

In the variable lens described in the aforementioned literature, only the amount of change in the movable film is responsible for the optical effect, so that when the variable lens is used alone, the fields in which the lens is used are limited, or the variable lens does not have very high optical performance. When the variable lens is used in combination with another lens, the movable film is separate from the other lens by a large distance, so that it is not easy to design the other lens in such a way that the other lens corrects a variety of aberrations produced by the variable lens. Furthermore, the variable lens combined with the other lens increases the size of the optical system including the variable lens.

SUMMARY

To solve the problems described above, a variable lens according to an aspect of the present disclosure includes a first substrate that is light transmissive, a first liquid, a movable film that is in contact with the first liquid and is light transmissive and elastically deformable, a second liquid in contact with the movable film, and a second substrate that is light transmissive, the substrates, the film, and the liquids sequentially arranged in a direction in which a beam passes along an optical axis. The first and second liquids differ from each other in terms of refractive index. Pressures of the first and second liquids are adjusted to cause the movable film to curve in a direction along the optical axis. At least one of the first and second substrates has power as a lens.

A variable lens unit according to another aspect of the present disclosure includes the variable lens described above, and an adjustment mechanism that changes a focal length of the variable lens. The variable lens has a first communication port that communicates with the first space, and a second communication port that communicates with the second space. The adjustment mechanism adjusts the pressure of the first liquid injected into the first space via the first communication port and adjusts the pressure of the second liquid injected into the second space via the second communication port.

An optical system according to another aspect of the present disclosure includes the variable lens described above and a first optical system, the two optical systems sequentially arranged from an enlargement side toward a reduction side in a direction in which a beam passes, and the variable lens disposed at a position closest to the enlargement side.

A projector according to another aspect of the present disclosure includes the optical system described above, and an image formation section that forms a projection image in a reduction-side conjugate plane of the optical system, and the image formation section includes a light source and a light modulator that modulates a beam from the light source.

An imaging apparatus according to another aspect of the present disclosure includes the optical system described above, and an imaging device disposed in a reduction-side conjugate plane of the optical system.

BRIEF DESCRIPTION OF THE DRAWINGS

FIG. 5 is a schematic view showing changes in the focal length of the variable lens in the first embodiment.

FIG. 6 shows the MTF of the optical system set at a standard distance in the first embodiment.

FIG. 10 is a schematic view showing the changes in the focal length of the variable lens in the second embodiment.

FIG. 14 is a beam diagram showing beams traveling in the optical system according to a third embodiment.

FIG. 15 is a schematic view showing the changes in the focal length of the variable lens in the third embodiment.

FIG. 17 shows the MTF of the optical system set at the short distance in the third embodiment.

DESCRIPTION OF EMBODIMENTS

A variable lens, a variable lens unit, an optical system, a projector, and an imaging apparatus according to an embodiment of the present disclosure will be described below with reference to the drawings.

Projector

Figure 1:
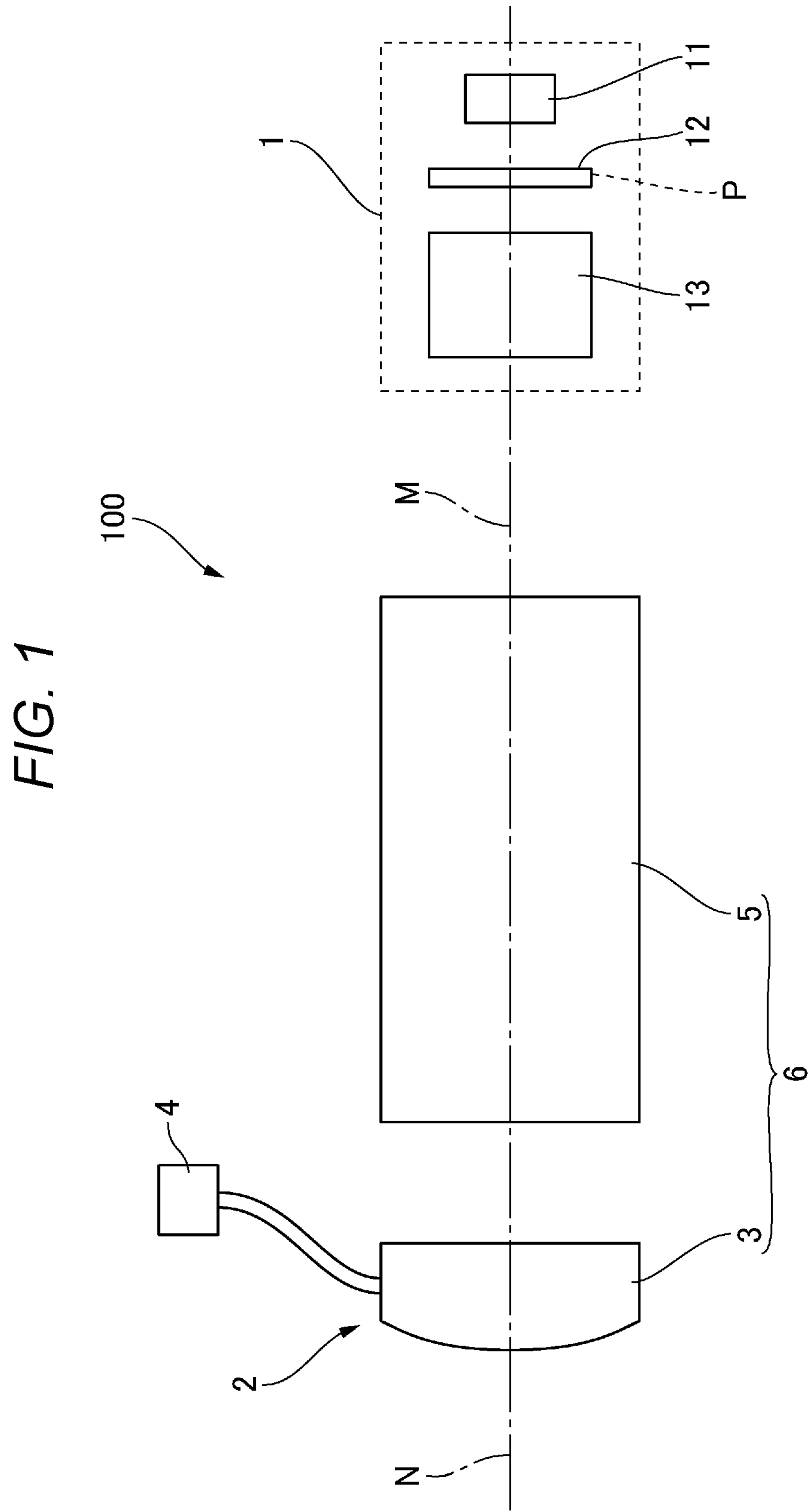
FIG. 1 describes a projector according to a first embodiment.

FIG. 1 describes a projector 100 according to a first embodiment. The projector 100 includes a variable lens unit 2, a first optical system 5, and an image formation section 1, as shown in FIG. 1. The variable lens unit 2 includes a variable lens 3 and an adjustment mechanism 4, which changes the focal length of the variable lens 3. The variable lens 3 and the first optical system 5 constitute an optical system 6 of the projector 100. The variable lens 3 and the first optical system 5 are sequentially arranged in the direction in which the beam passes from the enlargement side toward the reduction side. The variable lens 3 is disposed at a position closest to the enlargement side in the optical system 6. The image formation section 1 forms a projection image in a reduction-side conjugate plane P of the optical system 6. The image formation section 1 includes a light source 11, a light modulator 12, which modulates the beam from the light source 11, and a prism 13. The light modulator 12 modulates the beam from the light source 11 based on an image signal used to form the projection image to form the projection image in the reduction-side conjugate plane P. The light modulator 12 is a liquid crystal panel in the present embodiment. Although not shown, the light modulator 12 is formed of three light modulators. The prism 13 combines the beams output from the three light modulators 12 and outputs the combined light toward the optical system 6.

Variable Lens Unit

Figure 2:
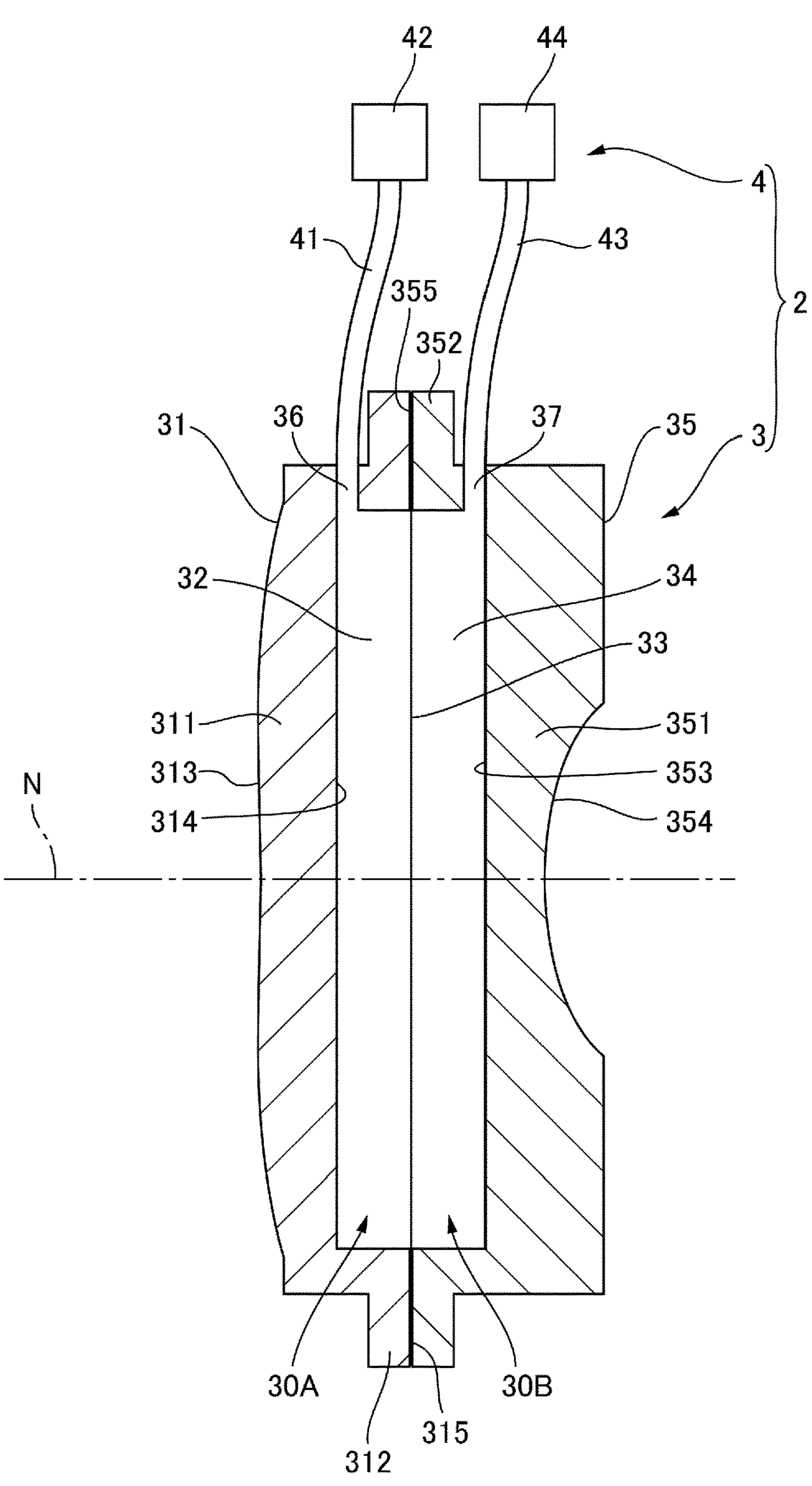
FIG. 2 is a schematic view of a variable lens unit.
Figure 3:
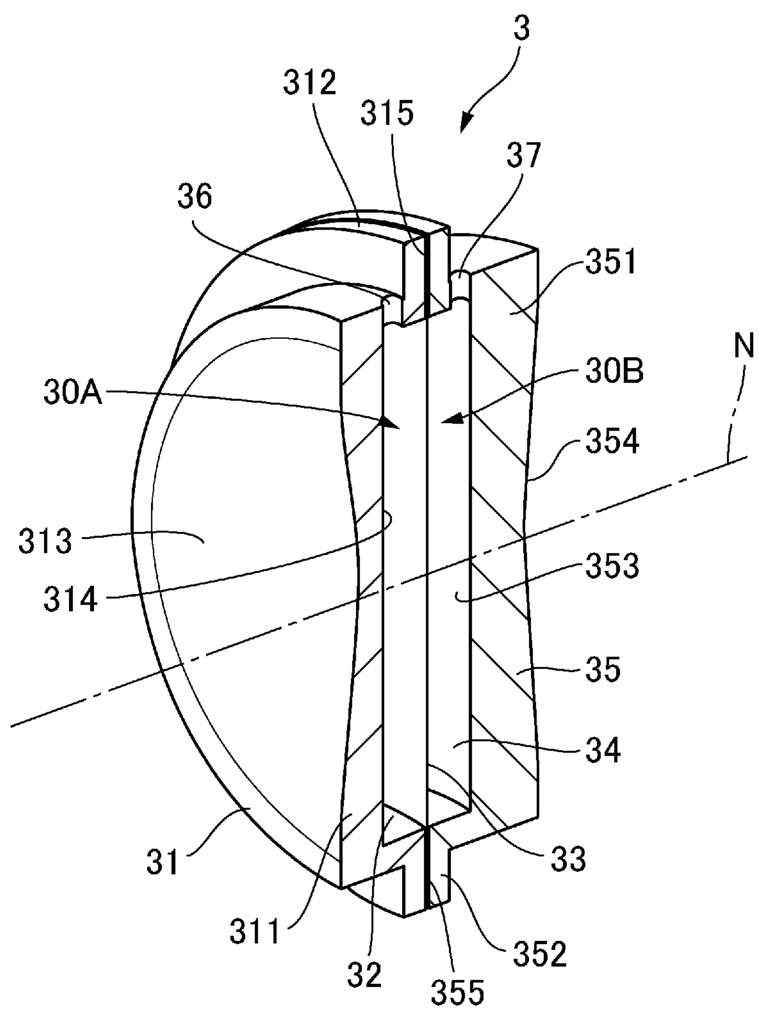
FIG. 3 is a cross-sectional perspective view of a variable lens.

FIG. 2 is a schematic view of the variable lens unit 2. FIG. 3 is a cross-sectional perspective view of the variable lens 3. The variable lens unit 2 includes the variable lens 3 and the adjustment mechanism 4, which changes the focal length of the variable lens 3, as shown in FIG. 2.

The variable lens 3 has negative power. The variable lens 3 includes a first substrate 31, which is light transmissive, a first liquid 32, a movable film 33, which is in contact with the first liquid 32 and is light transmissive and elastically deformable, a second liquid 34, which is in contact with the movable film 33, and a second substrate 35, which is light transmissive, the components described above sequentially arranged in the direction in which the beam passes along an optical axis N, as shown in FIGS. 2 and 3. In the present embodiment, the side at which the first substrate 31 is located is the enlargement side, and the side at which the second substrate 35 is located is the reduction side.

The first substrate 31 is made of a resin material. The first substrate 31 includes a main body 311 and a flange 312, which surrounds the outer circumference of the main body 311. The main body 311 has a first surface 313, which faces the enlargement side, and a second surface 314, which faces the reduction side. The first surface 313 is a lens surface having a convex shape and having power. The first surface 313 has an aspheric shape. The second surface 314 has a planar shape. The first substrate 31 therefore has power as a lens. The flange 312 has a first flange surface 315, which surrounds the outer circumference of the second surface 314 and is shifted from the second surface 314 toward the reduction side.

The second substrate 35 is made of a resin material. The second substrate 35 includes a main body 351 and a flange 352, which surrounds the outer circumference of the main body 351. The main body 351 has a third surface 353, which faces the enlargement side, and a fourth surface 354, which faces the reduction side. The third surface 353 has a planar shape. The fourth surface 354 is a lens surface having a concave shape and having power. The fourth surface 354 has an aspheric shape. The second substrate 35 therefore has power as a lens. The flange 352 has a second flange surface 355, which surrounds the outer circumference of the third surface 353 and is shifted from the third surface 353 toward the enlargement side.

The first substrate 31 and the second substrate 35 are fixed to each other into a single substrate, for example, via an adhesive applied to the first flange surface 315 and the second flange surface 355.

The movable film 33 is transparent or semi-transparent and light transmissive. The movable film 33 is made of a polymer, such as polyurethane resins, silicone resins, and fluoropolymers. The movable film 33 is so fixed that an outer circumferential portion thereof is provided between the first flange surface 315 and the second flange surface 355.

The first liquid 32 fills a first space 30A formed between the second surface 314 and the movable film 33. The second liquid 34 fills a second space 30B formed between the movable film 33 and the third surface 353. The first liquid 32 and the second liquid 34 differ from each other in terms of refractive index. The first liquid 32 and the second liquid 34 are, for example, pure water, pure water containing sucrose, or silicone oil and are selected as appropriate so that the two liquids have refractive indices different from each other. In the present embodiment, the refractive index of the first liquid 32 is greater than the refractive index of the second liquid 34.

The variable lens 3 has a first communication port 36, which communicates with the first space 30A, and a second communication port 37, which communicates with the second space 30B.

The adjustment mechanism 4 includes a first communication tube 41, which communicates with the first communication port 36, a first pressure adjuster 42, which adjusts the pressure of the first liquid 32 injected into the first space 30A via the first communication port 36 and the first communication tube 41, a second communication tube 43, which communicates with the second communication port 37, a second pressure adjuster 44, which adjusts the pressure of the second liquid 34 injected into the second space 30B via the second communication port 37 and the second communication tube 43, as shown in FIG. 2. The first communication tube 41 is filled with the first liquid 32. The second communication tube 43 is filled with the second liquid 34. The first pressure adjustor 42 and the second pressure adjustor 44 are each a pump.

The first pressure adjustor 42 and the second pressure adjustor 44 can adjust the pressures of the first liquid 32 and the second liquid 34 to curve the movable film 33 in the direction along the optical axis N and can also adjust the amount of curve. For example, when the first pressure adjustor 42 and the second pressure adjustor 44 adjust the pressure of the first liquid 32 to be greater than the pressure of the second liquid 34, the movable film 33 curves in the direction along the optical axis N to have a convex shape in the direction toward the second substrate 35. When the first pressure adjustor 42 and the second pressure adjustor 44 adjust the pressure of the second liquid 34 to be greater than the pressure of the first liquid 32, the movable film 33 curves in the direction along the optical axis N to have a convex shape in the direction toward the first substrate 31. Therefore, the first pressure adjustor 42 and the second pressure adjustor 44 curve the movable film 33 in the direction along the optical axis N to cause the movable film 33 to be a lens surface having lens power, so that the first liquid 32, the first liquid 32, the movable film 33, and the second liquid 34 function as a variable-focal-length lens. That is, the focal length of the variable lens 3 can be changed by adjusting the pressures of the first liquid 32 and the second liquid 34 to curve the movable film 33 in the direction along the optical axis N.

First Optical System

Figure 4:
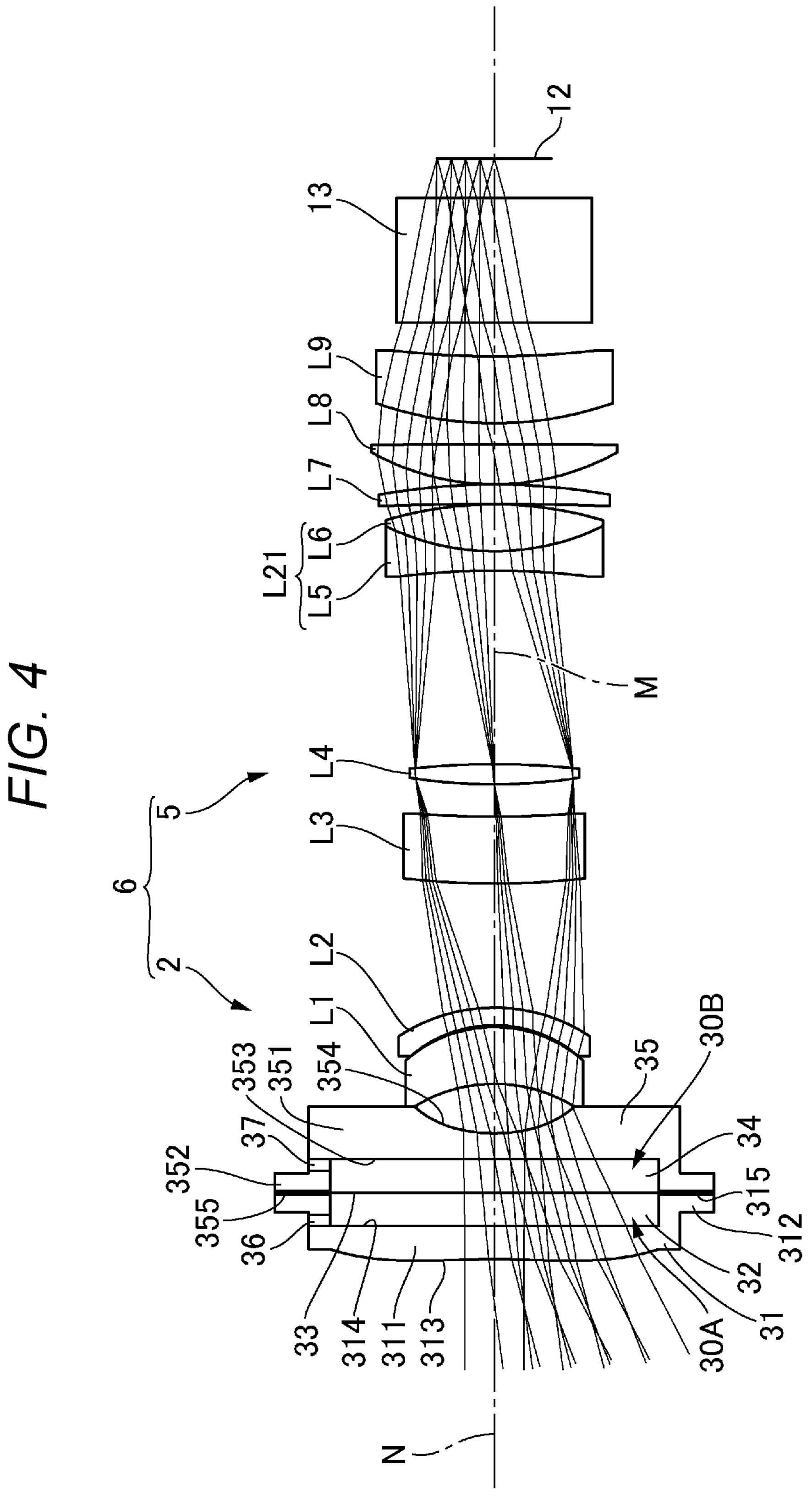
FIG. 4 is a beam diagram showing beams traveling in an optical system according to the first embodiment.

FIG. 4 is a beam diagram showing beams traveling in the optical system 6. In FIG. 4, the adjustment mechanism 4 is omitted. The first optical system 5 is formed of a plurality of optical elements. In the present embodiment, the first optical system 5 is formed of nine lenses L1 to L9, as shown in FIG. 4. The lenses L1 to L9 are arranged in this order from the enlargement side toward the reduction side. The lens L1 has negative power. The lens L1 has a concave surface at the enlargement side and a convex surface at the reduction side. The lens L2 has negative power. The lens L2 has a concave surface at the enlargement side and a convex surface at the reduction side. The lens L3 has positive power. The lens L3 has a convex surface at the enlargement side and a concave surface at the reduction side. The lens L4 has positive power. The lens L4 has convex surfaces at the enlargement and reduction sides. The lens L5 is a negative lens. The lens L5 has concave surfaces both at the enlargement and reduction sides. The lens L6 has positive power. The lens L6 has convex surfaces at the enlargement and reduction sides. The lens L5 and the lens L6 are bonded to each other into a cemented doublet L21. The lens L7 has positive power. The lens L7 has a concave surface at the enlargement side and a convex surface at the reduction side. The lens L8 has positive power. The lens L8 has convex surfaces both at the enlargement and reduction sides. The lens L9 has positive power. The lens L9 has a convex surface at the enlargement side and a concave surface at the reduction side. The nine lenses L1 to L9 are arranged along an optical axis M of the first optical system 5. The optical axis M of the first optical system 5 coincides with the optical axis N of the variable lens 3.

Optical System

The optical system 6 includes the variable lens 3 and the first optical system 5 sequentially arranged from the enlargement side toward the reduction side in the direction in which the beam passes. The projection distance of the optical system 6 can be changed by changing the focal length of the variable lens 3.

Data on Lenses of Optical System

Data on the lenses of the optical system 6 are listed below. The surfaces of the lenses are numbered sequentially from the enlargement side toward the reduction side. Reference characters are given to a screen, the variable lens, the lenses, the prism, and the liquid crystal panels. An aspheric surface has a surface number followed by *. R represents the radius of curvature. D represents the axial inter-surface spacing. nd represents the refractive index. νd represents the Abbe number at the d line. Y represents the effective radius. R, D, and Y are each expressed in millimeters.

| Reference character | Surface number | R | D | nd | νd | Mode | Y |
|---|---|---|---|---|---|---|---|
| S | 0 | 0.00000 | Variable spacing 1 | | | Refraction | |
| 31 | *1 | −244.73904 | 9.915981 | 1.50940 | 56.47 | Refraction | 44.000 |
| 32 | 2 | 0.00000 | Variable spacing 2 | 1.42160 | 55.00 | Refraction | 44.000 |
| 33, 34 | 3 | Variable radius of curvature | Variable spacing 3 | 1.33000 | 55.00 | Refraction | 44.000 |
| 35 | 4 | 0.00000 | 7.705633 | 1.50940 | 56.47 | Refraction | 44.000 |
| | *5 | 42.50833 | 14.818151 | | | Refraction | 22.075 |
| L1 | 6 | −40.00000 | 16.966102 | 1.44181 | 92.79 | Refraction | 21.992 |
| | 7 | −35.84644 | 0.562379 | | | Refraction | 23.391 |
| L2 | 8 | −34.21570 | 5.246290 | 1.79410 | 46.86 | Refraction | 23.390 |
| | 9 | −46.16473 | 37.125395 | | | Refraction | 25.218 |
| L3 | 10 | 207.09845 | 20.000000 | 1.86966 | 20.02 | Refraction | 23.936 |
| | 11 | 268.05612 | 9.701068 | | | Refraction | 22.583 |
| L4 | 12 | 145.09881 | 6.000000 | 1.80784 | 46.02 | Refraction | 22.000 |
| | 13 | −200.45266 | 57.892504 | | | Refraction | 22.276 |
| L5 | 14 | −200.82057 | 5.793231 | 1.88551 | 26.45 | Refraction | 26.352 |
| L6 | 15 | 65.42958 | 14.006619 | 1.44491 | 85.33 | Refraction | 27.719 |
| | 16 | −99.87879 | 0.100000 | | | Refraction | 28.817 |
| L7 | 17 | −916.96935 | 5.817513 | 1.80420 | 46.50 | Refraction | 30.000 |
| | 18 | −174.72890 | 0.100000 | | | Refraction | 30.648 |
| L8 | 19 | 66.74485 | 12.000000 | 1.45329 | 84.53 | Refraction | 32.711 |
| | 20 | −2612.20845 | 6.250177 | | | Refraction | 32.523 |
| L9 | 21 | 94.64430 | 20.000000 | 1.79907 | 46.68 | Refraction | 31.450 |
| | 22 | 233.88931 | 10.000000 | | | Refraction | 28.109 |

-continued

| Reference character | Surface number | R | D | nd | vd | Mode | Y |
|---|---|---|---|---|---|---|---|
| 13 | 23 | 0.00000 | 37.300000 | 1.51680 | 64.17 | Refraction | 25.831 |
| | 24 | 0.00000 | 11.800000 | | | Refraction | 19.231 |
| 12 | 25 | 0.00000 | 0.000000 | | | Refraction | 16.010 |

Figure 5:
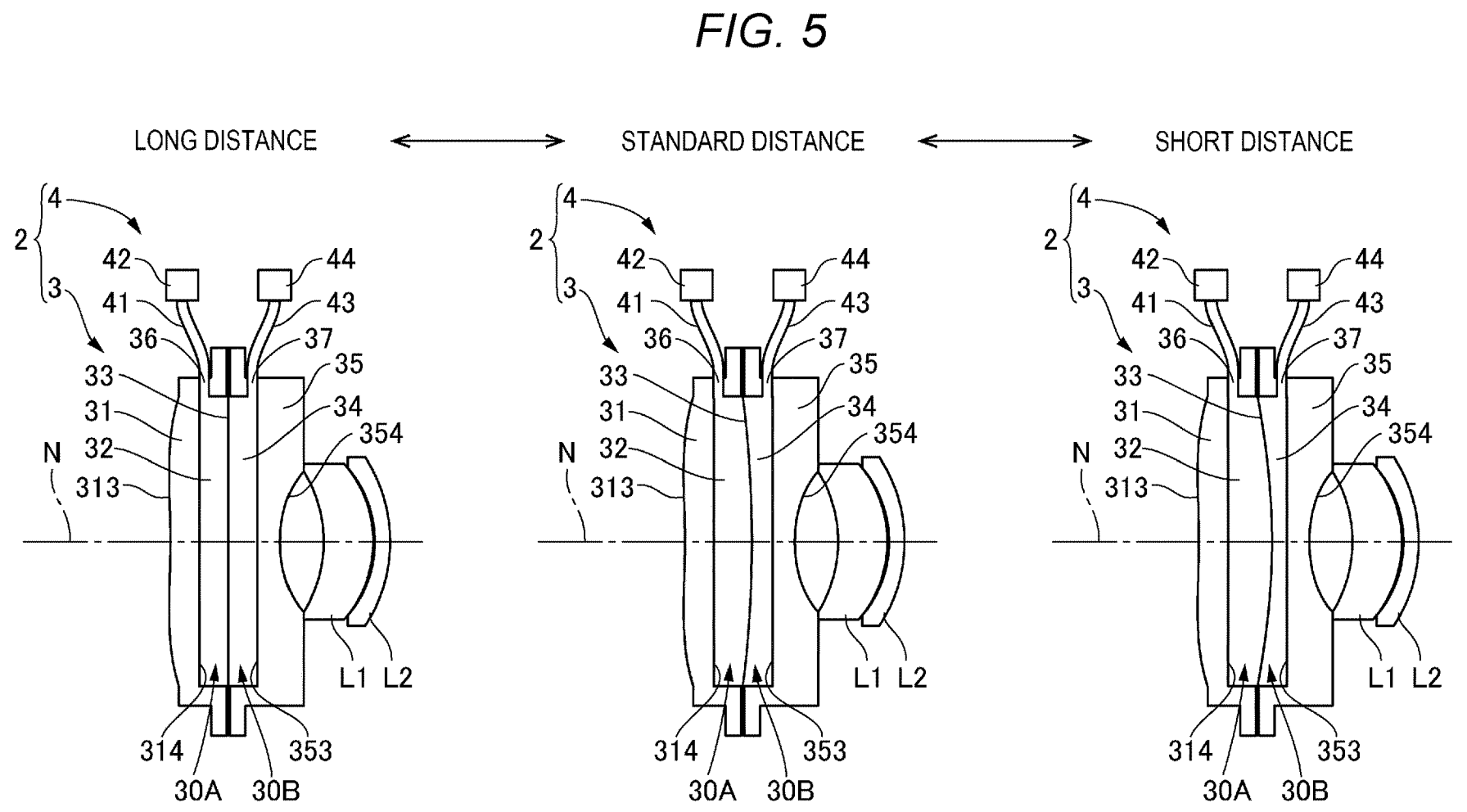

The optical system 6 has a changeable projection distance selected from a standard distance, a short distance shorter than the standard distance, and a long distance longer than the standard distance. When the projection distance is changed, focusing is performed by changing the focal length of the variable lens 3. FIG. 5 is a schematic view showing the changes in the focal length of the variable lens 3. When the projection distance is the standard distance, the pressure of the first liquid 32 is adjusted by the adjustment mechanism 4 to be greater than the pressure of the second liquid 34 in the variable lens 3, so that the movable film 33 has a convex shape curved toward the reduction side, as shown in FIG. 5.

When the projection distance is the short distance, the pressure of the first liquid 32 is adjusted by the adjustment mechanism 4 to be further greater than the pressure of the second liquid 34 in the variable lens 3, so that the movable film 33 has a convex shape curved by a greater amount toward the reduction side. At this point, the focal length of the variable lens 3 is shorter than that achieved when the projection distance is the standard distance. That is, the power of the variable lens 3 increases.

When the projection distance is the long distance, the pressure of the first liquid 32 and the pressure of the second liquid 34 are adjusted by the adjustment mechanism 4 to be equal to each other in the variable lens 3, so that the movable film 33 has a planar shape that is not curved. At this point, the focal length of the variable lens 3 is longer than that achieved when the projection distance is the standard distance. That is, the power of the variable lens 3 decreases. The absolute value of the radius of curvature of the curved movable film 33 therefore decreases as the projection distance increases.

The table below shows the variable spacings 1, 2, and 3, and the variable radius of curvature at each of the projection distances where the focusing is performed. The variable spacing 1 is the projection distance. The variable spacing 2 is the axial inter-surface spacing between the second surface 314 of the first substrate 31 and the movable film 33, that is, the axial thickness of the first liquid 32. The variable spacing 3 is the axial inter-surface spacing between the movable film 33 and the third surface 353 of the second substrate 35, that is, the axial thickness of the second liquid 34. The variable radius of curvature is the radius of the curvature of the movable film 33.

| | Standard distance | Short distance | Long distance |
|---|---|---|---|
| Variable spacing 1 | 4000.000000 | 2000.000000 | 20000.000000 |
| Variable spacing 2 | 12.036493 | 14.457126 | 10.000000 |
| Variable spacing 3 | 7.963507 | 5.542874 | 10.000000 |
| Variable radius of curvature | −476.34531 | −219.40885 | Infinity |

The aspheric coefficients are listed below.

| | Surface number | |
|---|---|---|
| | 1 | 5 |
| Conic constant | 7.127571E+00 | −1.753983E+00 |
| Fourth-order coefficient | 2.9429E−06 | 8.532093E−06 |
| Sixth-order coefficient | −1.185737E−09 | 1.501953E−09 |
| Eighth-order coefficient | 3.987802E−13 | −4.000129E−12 |
| Tenth-order coefficient | −5.387882E−17 | 1.020233E−14 |

Effects and Advantages

The variable lens 3 includes the first substrate 31, which is light transmissive, the first liquid 32, the movable film 33, which is in contact with the first liquid 32 and is light transmissive and elastically deformable, the second liquid 34, which is in contact with the movable film 33, and the second substrate 35, which is light transmissive, the components described above sequentially arranged in the direction in which the beam passes along the optical axis N. The refractive index of the first liquid 32 differs from and is greater than the refractive index of the second liquid 34. The first substrate 31 and the second substrate 35 each have power as a lens. The focal length of the variable lens 3 can be changed by adjusting the pressures of the first liquid 32 and the second liquid 34 to curve the movable film 33 in the direction along the optical axis N.

According to the present embodiment, the first liquid 32, the movable film 33, and the second liquid 34, which function as a focal-length-variable lens, are sandwiched between the first substrate 31 and the second substrate 35, which each have power as a lens. The distance between the movable film 33 and the first substrate 31 and the distance between the movable film 33 and the second substrate 35 can thus be reduced, so that the first substrate 31 and the second substrate 35 can satisfactorily correct a variety of aberrations produced by the variable lens 3. Furthermore, the fields in which the variable lenses 3 is used can be widened by adjusting the lens power of each of the first substrate 31 and the second substrate 35. Moreover, the variable lens 3 according to the present embodiment, which does not require another lens for correcting the variety of aberrations produced by the variable lens, allows reduction in the size of the optical system including the variable lens 3 according to the present embodiment.

In the variable lens 3 according to the present embodiment, the first substrate 31 and the second substrate 35 are each made of a resin material. The first substrate 31 and the second substrate 35 are therefore each readily provided with a lens surface.

In the present embodiment, the first substrate 31 has the first surface 313, which faces the side opposite from the second substrate 35, the second surface 314, which faces the second substrate 35, and the first flange surface 315, which surrounds the outer circumference of the second surface 314 and is shifted from the second surface 314 toward the second substrate 35. The second substrate 35 has the third surface 353, which faces the first substrate 31, the fourth surface 354, which faces the side opposite from the first substrate 31, and the second flange surface 355, which surrounds the outer circumference of the third surface 353 and is shifted from the third surface 353 toward the first substrate 31. The movable film 33 is so fixed that an outer circumferential portion thereof is provided between the first flange surface 315 and the second flange surface 355. The first liquid 32 fills the first space 30A formed between the second surface 314 and the movable film 33. The second liquid 34 fills the second space 30B formed between the movable film 33 and the third surface 353. The variable lens 3 can thus be formed in the form of a single component with the first substrate 31 and the first liquid 32 being in contact with each other and the second liquid 34 and the second substrate 35 being in contact with each other.

In the variable lens 3 according to the present embodiment, the first surface 313 and the fourth surface 354 each have an aspheric shape. The variety of aberrations produced by the variable lens 3 can therefore be more satisfactorily corrected. The variable lens 3 according to the present embodiment, which does not require another lens for correcting the variety of aberrations produced by the variable lens, can further reduce the size of the optical system including the variable lens 3 according to the present embodiment.

The variable lens unit 2 according to the present embodiment includes the variable lens 3 and the adjustment mechanism 4, which changes the focal length of the variable lens 3. The variable lens 3 has the first communication port 36, which communicates with the first space 30A, and the second communication port 37, which communicates with the second space 30B. The adjustment mechanism 4 adjusts the pressure of the first liquid 32 injected into the first space 30A via the first communication port 36, and adjusts the pressure of the second liquid 34 injected into the second space 30B via the second communication port 37. The adjustment mechanism 4 can thus readily change the focal length of the variable lens 3.

The optical system 6 according to the present embodiment includes the variable lens 3 and the first optical system 5 sequentially arranged from the enlargement side toward the reduction side in the direction in which the beam passes. The variable lens 3 is disposed at a position closest to the enlargement side. The projection distance of the optical system 6 can therefore be readily changed by changing the focal length of the variable lens 3. Since the variable lens 3 is disposed at a position closest to the enlargement side, the luminous flux passing through the variable lens 3 at each image height diverges. Since the variable lens 3 has an aspheric shape, the variety of aberrations produced by the first optical system 5 are readily corrected by the aspheric shape.

In the optical system 6 according to the present embodiment, the absolute value of the radius of curvature of the curved movable film 33 decreases as the projection distance of the optical system 6 increases. The optical system 6, when used in the projector 100, is used with the projection position set at the long distance more often than at the reference distance. Therefore, when the optical system 6 is used in the projector 100, the long focal length of the variable lens 3 allows reduction in the amount of curvature of the movable film 33. A smaller pressure thus acts on the movable film 33, so that the reliability of the movable film 33 can be improved. The movable film 33 responds more quickly when the adjustment mechanism 4 curves the movable film 33 in the case where the projection distance is changed between the standard distance and the long distance, in which the pressures applied by the adjustment mechanism 4 to the first liquid 32 and the second liquid 34 are small, than in the case where the projection distance is changed between the standard distance and the short distance. The responsiveness of the variable lens 3 can thus be increased in the range over which the projector 100 is appropriately used.

The projector 100 according to the present embodiment includes the optical system 6 and the image formation section 1, which forms a projection image in the reduction-side conjugate plane P of the optical system 6. The image formation section 1 includes the light source 11 and the light modulators 12, which modulate the beam from the light source 11. The thus configured projector 100 is compact and can satisfactorily correct the variety of aberrations.

Figure 7:
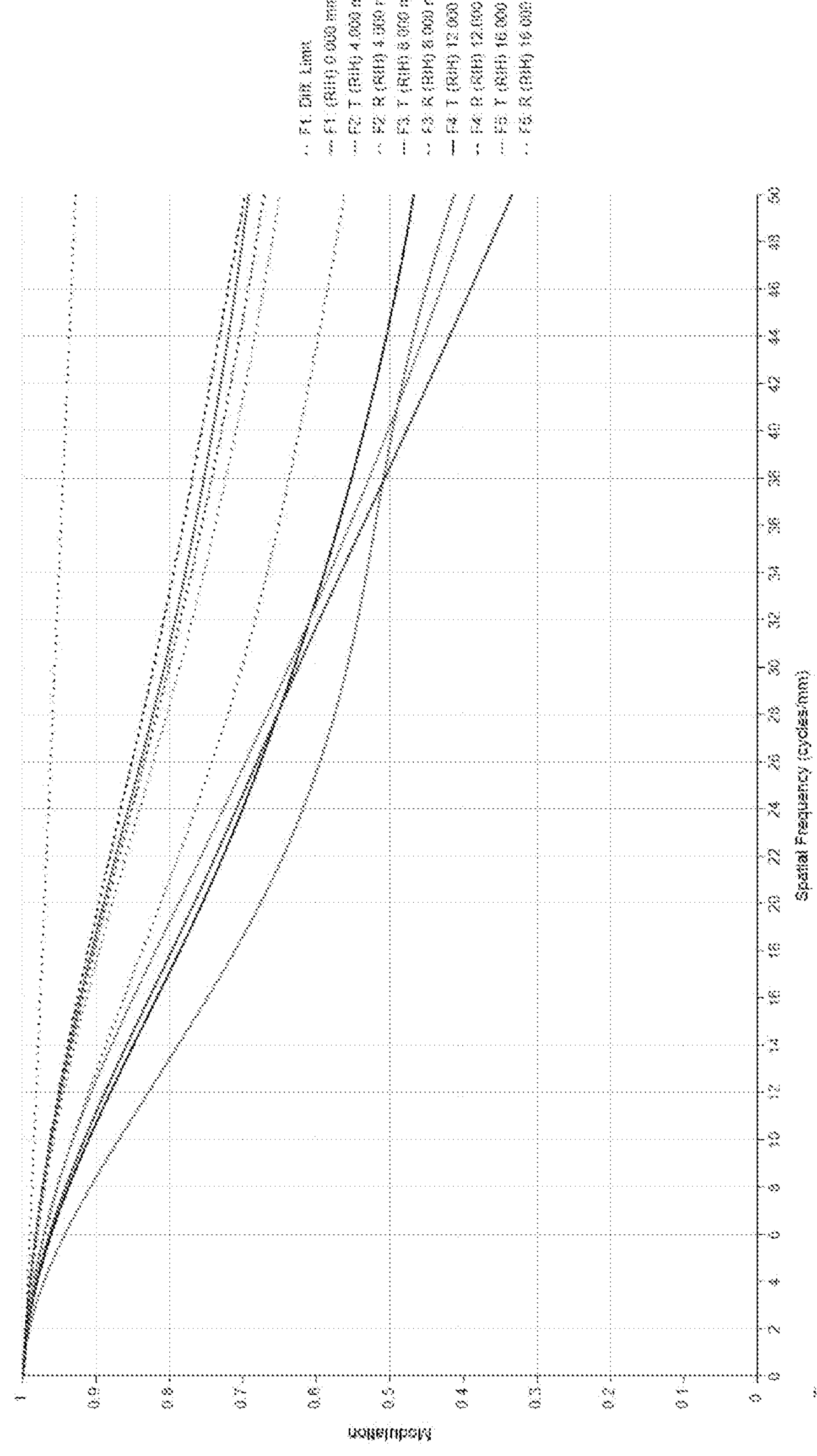
FIG. 7 shows the MTF of the optical system set at a short distance in the first embodiment.
Figure 8:
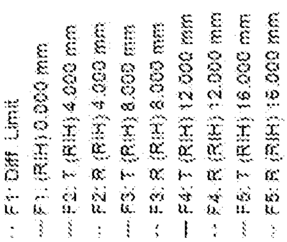
FIG. 8 shows the MTF of the optical system set at a long distance in the first embodiment.
Figure 8:
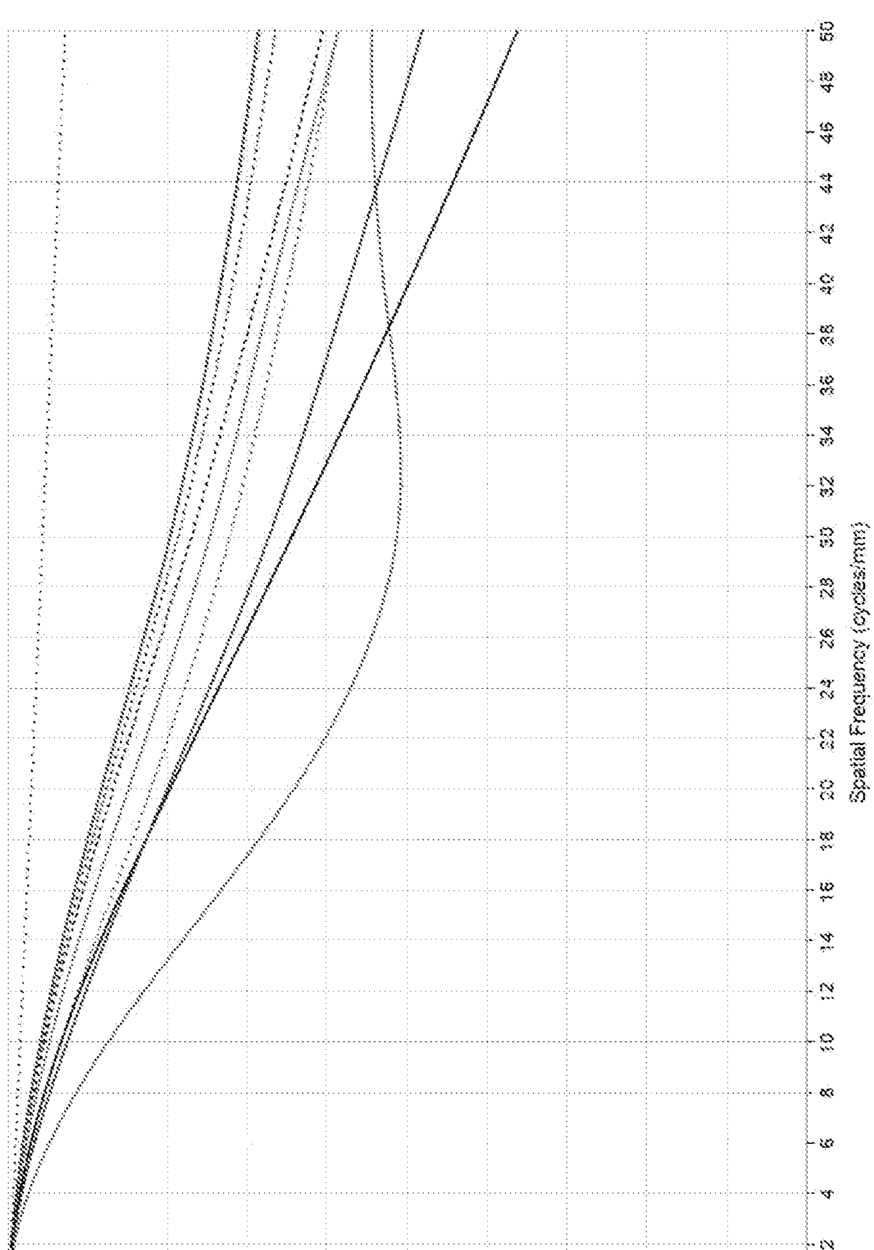

FIG. 6 shows the MTF of the optical system 6 set at the standard distance. FIG. 7 shows the MTF of the optical system 6 set at the short distance. FIG. 8 shows the MTF of the optical system 6 set at the long distance. In FIGS. 6 to 8, the horizontal axis represents the spatial frequency, and the vertical axis represents the contrast reproduction ratio. The optical system 6 according to the present embodiment provides high resolution, as shown in FIGS. 6 to 8.

Second Embodiment

Figure 9:
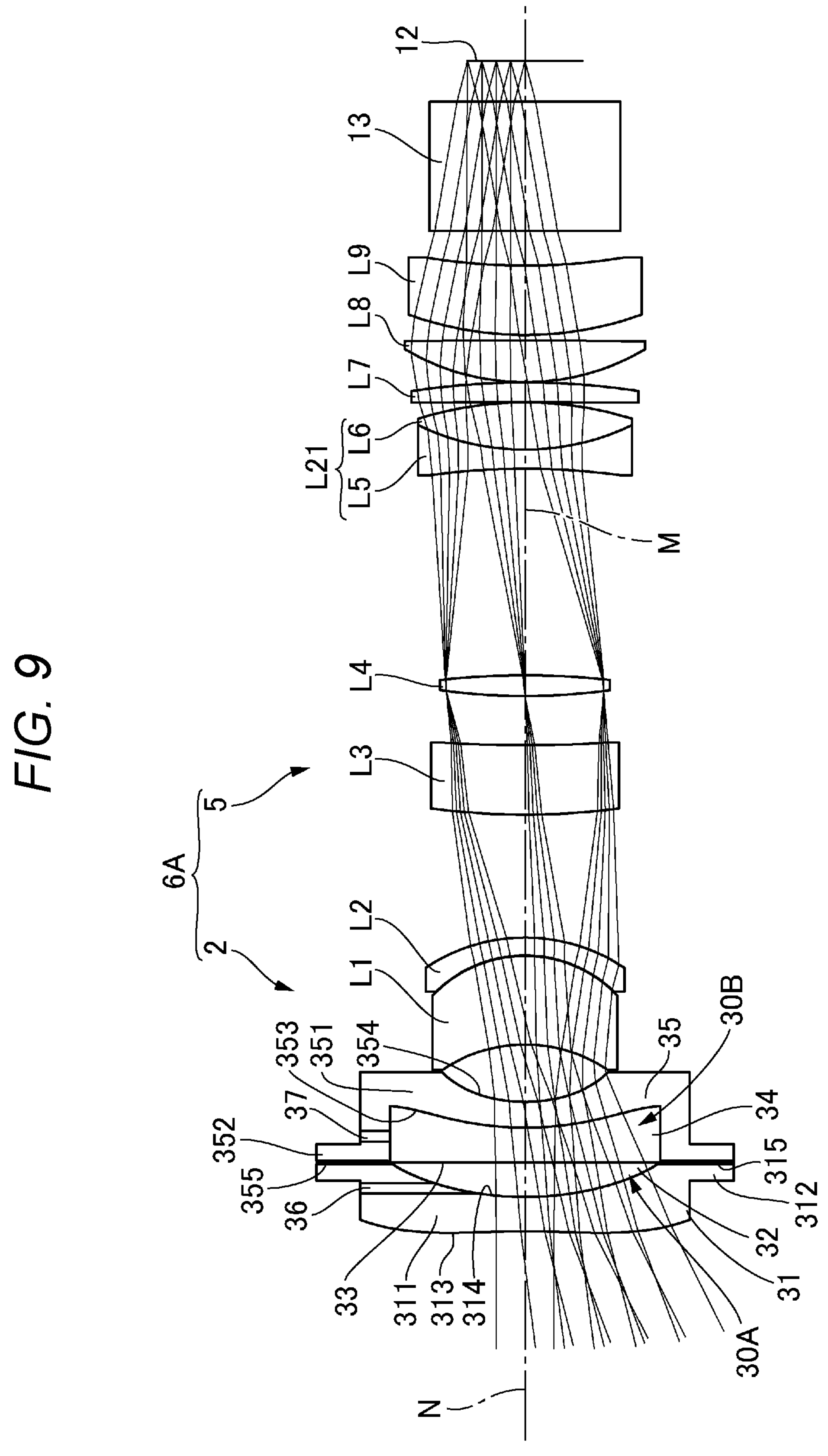
FIG. 9 is a beam diagram showing beams traveling in the optical system according to a second embodiment.

FIG. 9 is a beam diagram showing beams traveling in an optical system 6A according to a second embodiment. The optical system 6A according to the second embodiment is the same as the optical system 6 according to the first embodiment except that the variable lens 3 has a different shape. Therefore, in the second embodiment, the configurations that are the same as those in the first embodiment have the same reference characters, and the same configurations will not be described in some cases. In FIG. 9, the adjustment mechanism 4 is omitted.

The variable lens 3 includes the first substrate 31, which is light transmissive, the first liquid 32, the movable film 33, which is in contact with the first liquid 32 and is light transmissive and elastically deformable, the second liquid 34, which is in contact with the movable film 33, and the second substrate 35, which is light transmissive, the components described above sequentially arranged in the direction in which the beam passes along an optical axis N, as shown in FIG. 9.

The first substrate 31 is made of a resin material. The first substrate 31 includes the main body 311 and the flange 312, which surrounds the outer circumference of the main body 311. The main body 311 has the first surface 313, which faces the enlargement side, and the second surface 314, which faces the reduction side. The first surface 313 is a lens surface having a convex shape and having power. The first surface 313 has an aspheric shape. The second surface 314 is a lens surface having a concave shape and having power. The second surface 314 has an aspheric shape. The first substrate 31 therefore has power as a lens. The flange 312 has the first flange surface 315, which surrounds the outer circumference of the second surface 314 and is shifted from the second surface 314 toward the reduction side.

The second substrate 35 is made of a resin material. The second substrate 35 includes the main body 351 and the flange 352, which surrounds the outer circumference of the main body 351. The main body 351 has the third surface 353, which faces the enlargement side, and the fourth surface 354, which faces the reduction side. The third surface 353 is a lens surface having a convex shape and having power. The third surface 353 has an aspheric shape.

The fourth surface 354 is a lens surface having a concave shape and having power. The fourth surface 354 has an aspheric shape. The second substrate 35 therefore has power as a lens. The flange 352 has the second flange surface 355, which surrounds the outer circumference of the third surface 353 and is shifted from the third surface 353 toward the enlargement side.

The first substrate 31 and the second substrate 35 are fixed to each other into a single substrate, for example, via an adhesive applied to the first flange surface 315 and the second flange surface 355.

The movable film 33 is transparent or semi-transparent and light transmissive. The movable film 33 is made of a polymer, such as polyurethane resins, silicone resins, and fluoropolymers. The movable film 33 is so fixed that an outer circumferential portion thereof is provided between the first flange surface 315 and the second flange surface 355.

The first liquid 32 fills the first space 30A formed between the second surface 314 and the movable film 33. The second liquid 34 fills the second space 30B formed between the movable film 33 and the third surface 353. The first liquid 32 and the second liquid 34 differ from each other in terms of refractive index. The first liquid 32 and the second liquid 34 are, for example, pure water, pure water containing sucrose, or silicone oil and are selected as appropriate so that the two liquids have refractive indices different from each other. In the present embodiment, the refractive index of the first liquid 32 is greater than the refractive index of the second liquid 34.

The variable lens 3 has the first communication port 36, which communicates with the first space 30A, and the second communication port 37, which communicates with the second space 30B.

Data on Lenses of Optical System

Data on the lenses of the optical system 6A are listed below. The surfaces of the lenses are numbered sequentially from the enlargement side toward the reduction side. Reference characters are given to the screen, the variable lens, the lenses, the prism, and the liquid crystal panels. An aspheric surface has a surface number followed by *. R represents the radius of curvature. D represents the axial inter-surface spacing. nd represents the refractive index. νd represents the Abbe number at the d line. Y represents the effective radius. R, D, and Y are each expressed in millimeters.

| Reference character | Surface number | R | D | nd | νd | Mode | Y |
|---|---|---|---|---|---|---|---|
| S | 0 | 0.00000 | Variable spacing 1 | | | Refraction | |
| 31 | *1 | −247.02901 | 9.915981 | 1.50940 | 56.47 | Refraction | 44.000 |
| 32 | *2 | 83.55050 | Variable spacing 2 | 1.42160 | 55.00 | Refraction | 44.000 |
| 33, 34 | 3 | Variable radius of curvature | Variable spacing 3 | 1.33000 | 55.00 | Refraction | 44.000 |
| 35 | *4 | 86.54753 | 7.429394 | 1.50940 | 56.47 | Refraction | 44.000 |
| | *5 | 43.34137 | 16.488502 | | | Refraction | 22.650 |
| L1 | 6 | −40.00000 | 25.448961 | 1.43700 | 95.10 | Refraction | 22.355 |
| | 7 | −34.82206 | 0.117861 | | | Refraction | 24.307 |
| L2 | 8 | −34.69946 | 5.134756 | 1.84390 | 35.98 | Refraction | 24.263 |
| | 9 | −48.39896 | 35.683225 | | | Refraction | 26.203 |
| L3 | 10 | 198.79956 | 20.000000 | 1.86966 | 20.02 | Refraction | 24.682 |
| | 11 | 329.67474 | 14.136447 | | | Refraction | 23.209 |
| L4 | 12 | 164.13510 | 6.000000 | 1.79454 | 46.85 | Refraction | 22.000 |
| | 13 | −212.97732 | 59.644872 | | | Refraction | 22.273 |
| L5 | 14 | −190.17291 | 5.470429 | 1.88467 | 26.02 | Refraction | 25.942 |
| L6 | 15 | 66.78737 | 13.603516 | 1.44377 | 85.29 | Refraction | 27.216 |
| | 16 | −97.07183 | 0.100000 | | | Refraction | 28.267 |
| L7 | 17 | −2583.40817 | 5.660771 | 1.80404 | 46.51 | Refraction | 29.454 |
| | 18 | −203.41681 | 0.100000 | | | Refraction | 30.029 |
| L8 | 19 | 64.16861 | 12.000000 | 1.45786 | 84.66 | Refraction | 31.842 |
| | 20 | −2280.84949 | 1.955601 | | | Refraction | 31.609 |
| L9 | 21 | 93.14087 | 20.000000 | 1.80420 | 46.50 | Refraction | 30.797 |
| | 22 | 165.78574 | 10.000000 | | | Refraction | 27.144 |
| 13 | 23 | 0.00000 | 37.300000 | 1.51680 | 64.17 | Refraction | 25.163 |
| | 24 | 0.00000 | 11.799982 | | | Refraction | 19.007 |
| 12 | 25 | 0.00000 | 0.000000 | | | Refraction | 16.007 |

Figure 10:
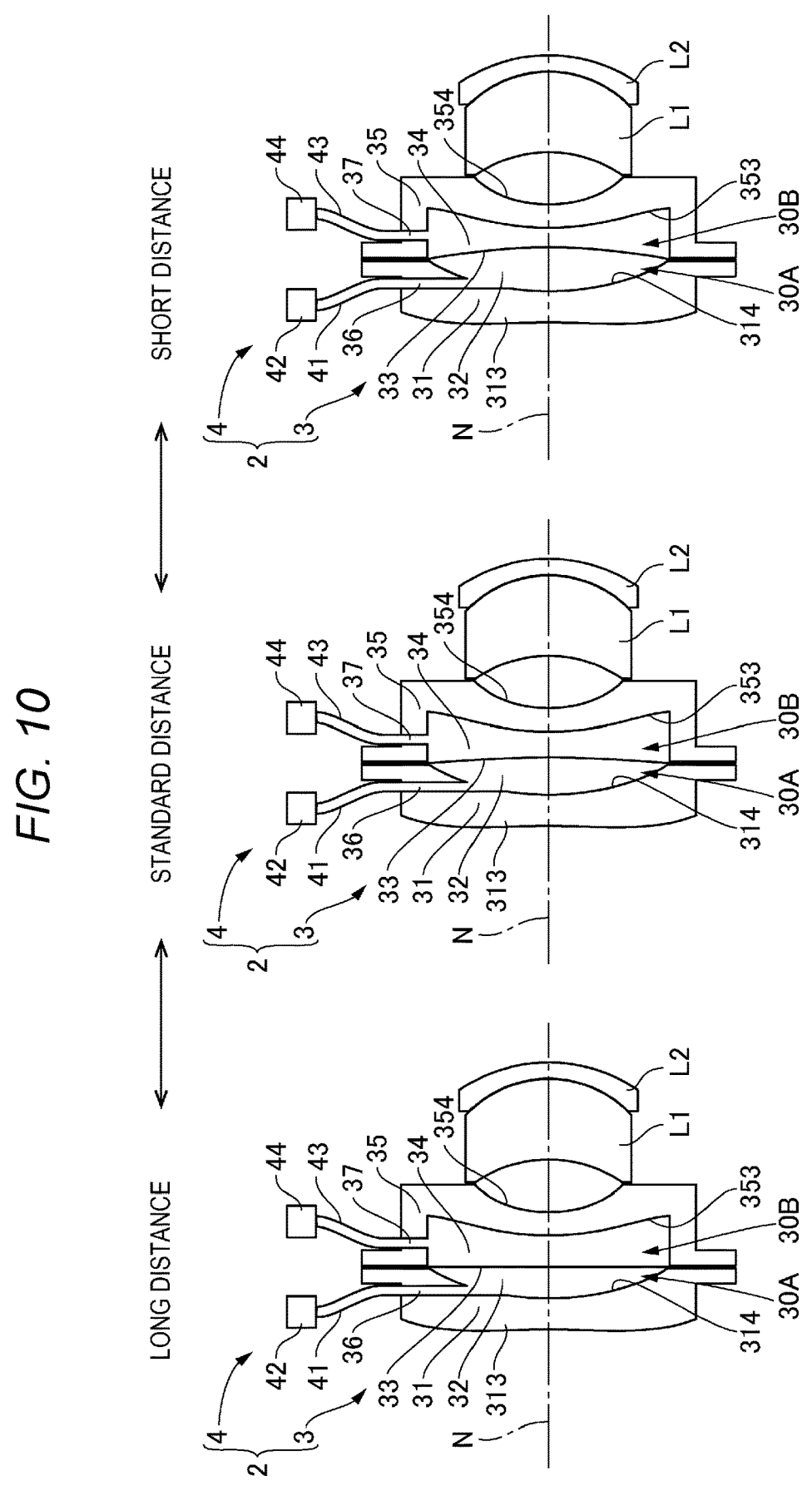

The optical system 6A has a changeable projection distance selected from the standard distance, the short distance shorter than the standard distance, and the long distance longer than the standard distance. When the projection distance is changed, focusing is performed by changing the focal length of the variable lens 3. FIG. 10 is a schematic view showing the changes in the focal length of the variable lens 3. When the projection distance is the standard distance, the pressure of the first liquid 32 is adjusted by the adjustment mechanism 4 to be greater than the pressure of the second liquid 34 in the variable lens 3, so that the movable film 33 has a convex shape curved toward the reduction side, as shown in FIG. 10.

When the projection distance is the short distance, the pressure of the first liquid 32 is adjusted by the adjustment mechanism 4 to be further greater than the pressure of the second liquid 34 in the variable lens 3, so that the movable film 33 has a convex shape curved by a greater amount toward the reduction side. At this point, the focal length of the variable lens 3 is shorter than that achieved when the projection distance is the standard distance. That is, the power of the variable lens 3 increases.

When the projection distance is the long distance, the pressure of the first liquid 32 and the pressure of the second liquid 34 are adjusted by the adjustment mechanism 4 to be equal to each other in the variable lens 3, so that the movable film 33 has a planar shape that is not curved. At this point, the focal length of the variable lens 3 is longer than that achieved when the projection distance is the standard distance. That is, the power of the variable lens 3 decreases. The absolute value of the radius of curvature of the curved movable film 33 therefore decreases as the projection distance increases.

The table below shows the variable spacings 1, 2, and 3, and the variable radius of curvature at each of the projection distances where the focusing is performed. The variable spacing 1 is the projection distance. The variable spacing 2 is the axial inter-surface spacing between the second surface 314 of the first substrate 31 and the movable film 33, that is, the axial thickness of the first liquid 32. The variable spacing 3 is the axial inter-surface spacing between the movable film 33 and the third surface 353 of the second substrate 35, that is, the axial thickness of the second liquid 34. The variable radius of curvature is the radius of the curvature of the movable film 33.

| | Standard distance | Short distance | Long distance |
|---|---|---|---|
| Variable spacing 1 | 4000.000000 | 2000.000000 | 20000.000000 |
| Variable spacing 2 | 12.065732 | 14.479164 | 10.000000 |
| Variable spacing 3 | 7.934268 | 5.520836 | 10.000000 |
| Variable radius of curvature | −469.63199 | −218.35133 | Infinity |

The aspheric coefficients are listed below.

| | Surface number | | | |
|---|---|---|---|---|
| | 1 | 2 | 4 | 5 |
| Conic constant | 5.870315E+00 | −4.134648E−01 | −1.17042E+00 | −1.902551E+00 |
| Fourth-order coefficient | 2.950505E−06 | 7.544222E−08 | 6.951796E−07 | 8.388071E−06 |
| Sixth-order coefficient | −1.170448E−09 | 1.060303E−10 | −1.259043E−09 | 1.461547E−09 |
| Eighth-order coefficient | 4.038055E−13 | 2.22508E−14 | 1.811317E−14 | −4.465009E−12 |
| Tenth-order coefficient | −5.47523E−17 | 8.355153E−17 | 2.312475E−17 | 9.386279E−15 |

Effects and Advantages

In the present embodiment, the second surface 314 and the third surface 353 each have an aspheric shape. The variety of aberrations produced by the variable lens 3 can therefore be more satisfactorily corrected. In the present embodiment, the configuration that is the same as that in the first embodiment can provide the effects and advantages that are the same as those provided by the first embodiment.

Figure 11:
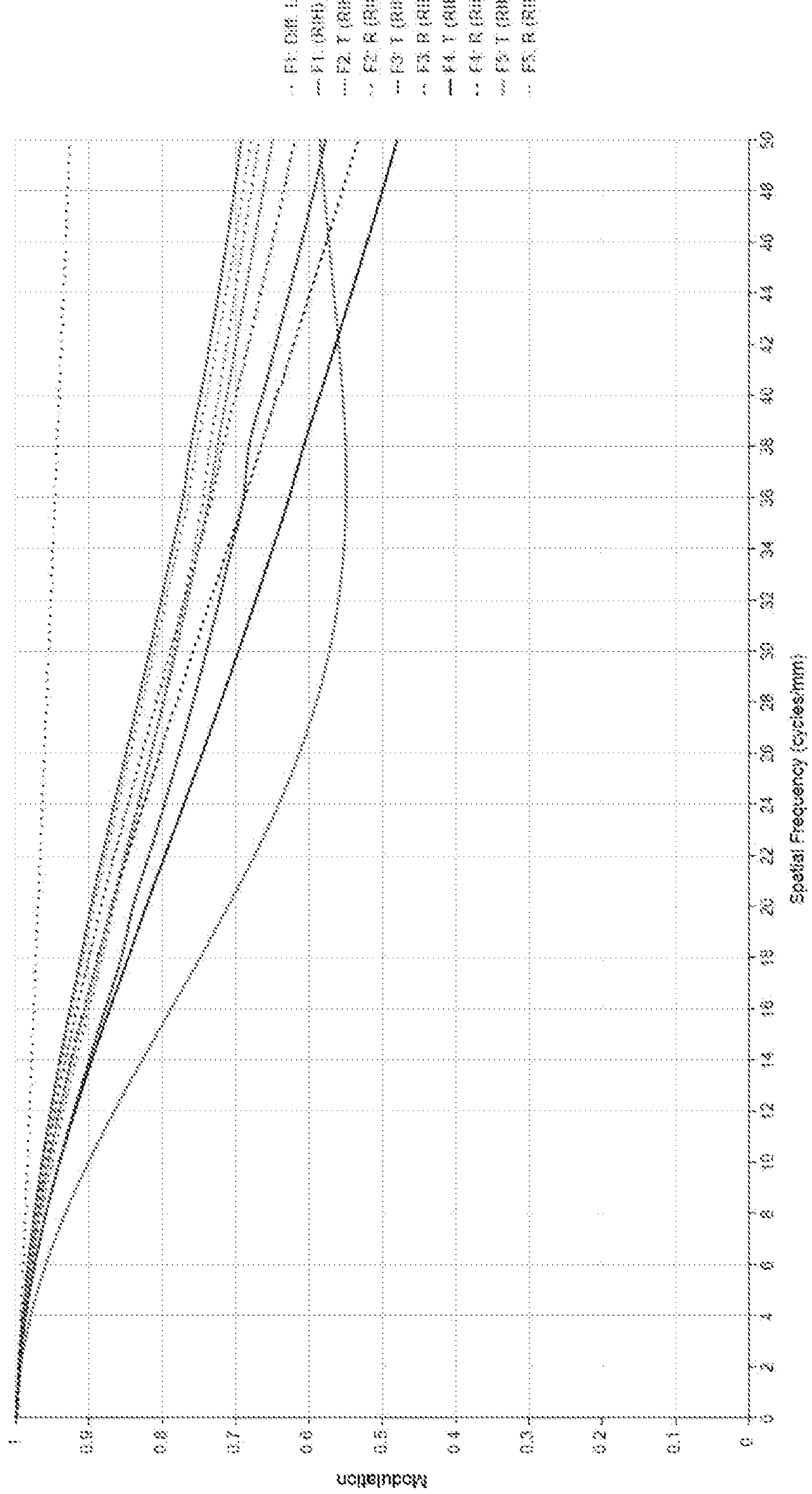
FIG. 11 shows the MTF of the optical system set at the standard distance in the second embodiment.
Figure 12:
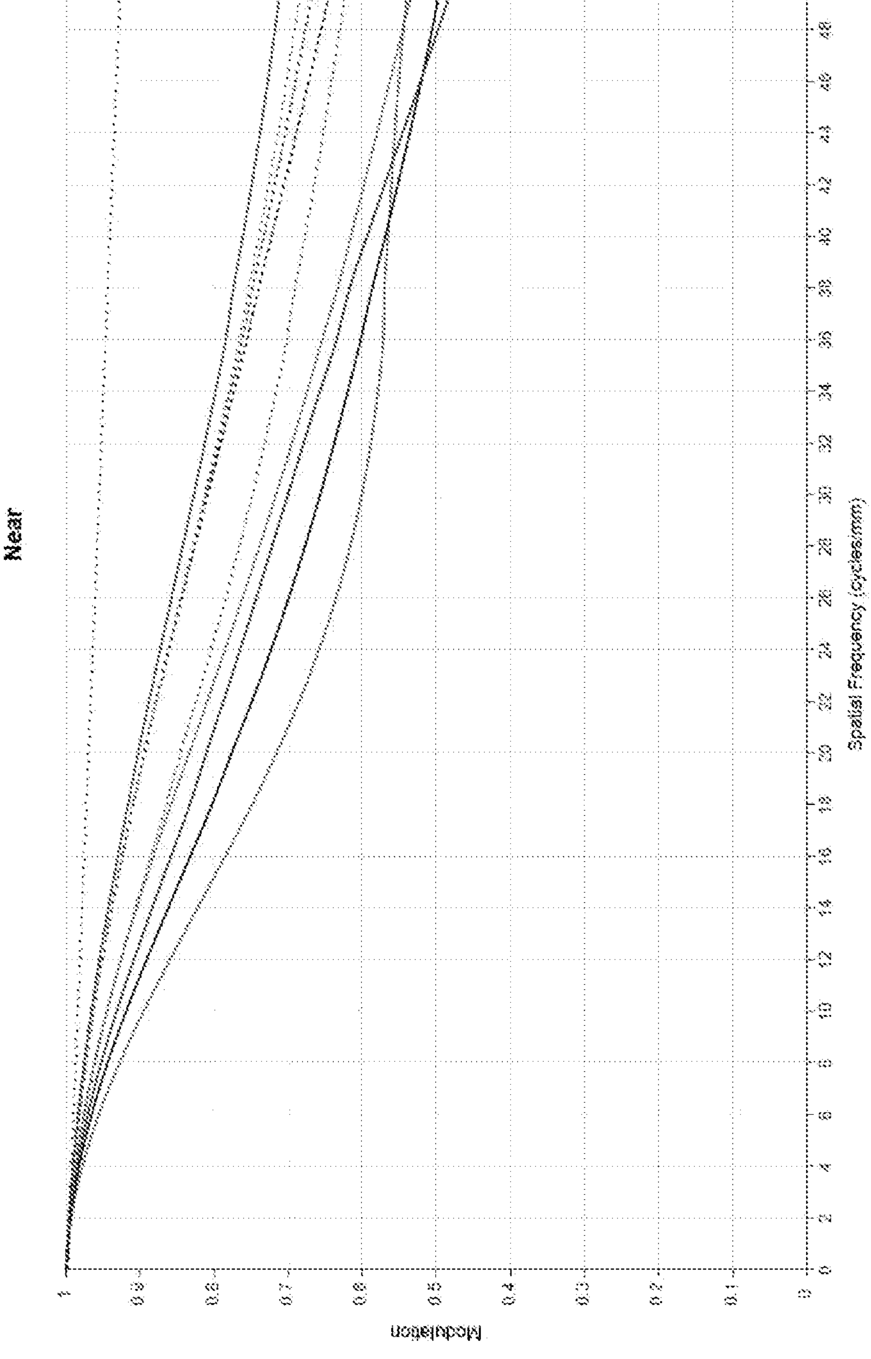
FIG. 12 shows the MTF of the optical system set at the short distance in the second embodiment.
Figure 13:
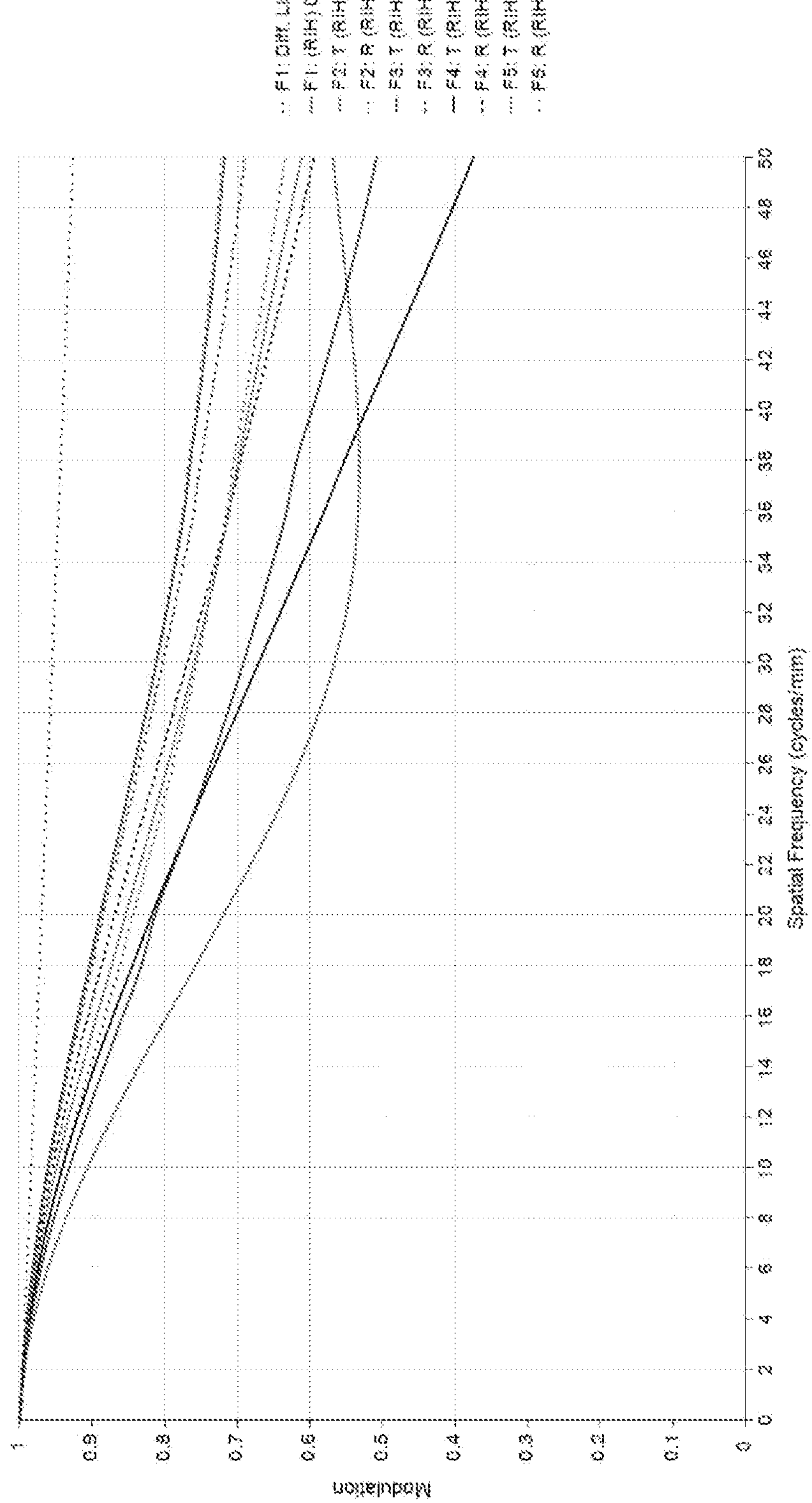
FIG. 13 shows the MTF of the optical system set at the long distance in the second embodiment.

FIG. 11 shows the MTF of the optical system 6A set at the standard distance. FIG. 12 shows the MTF of the optical system 6A set at the short distance. FIG. 13 shows the MTF of the optical system 6A set at the long distance. The optical system 6A according to the present embodiment provides high resolution, as shown in FIGS. 11 to 13, as in the first embodiment. The optical system 6A according to the present embodiment has higher resolution at the short distance than that in the first embodiment.

Third Embodiment

Figure 14:
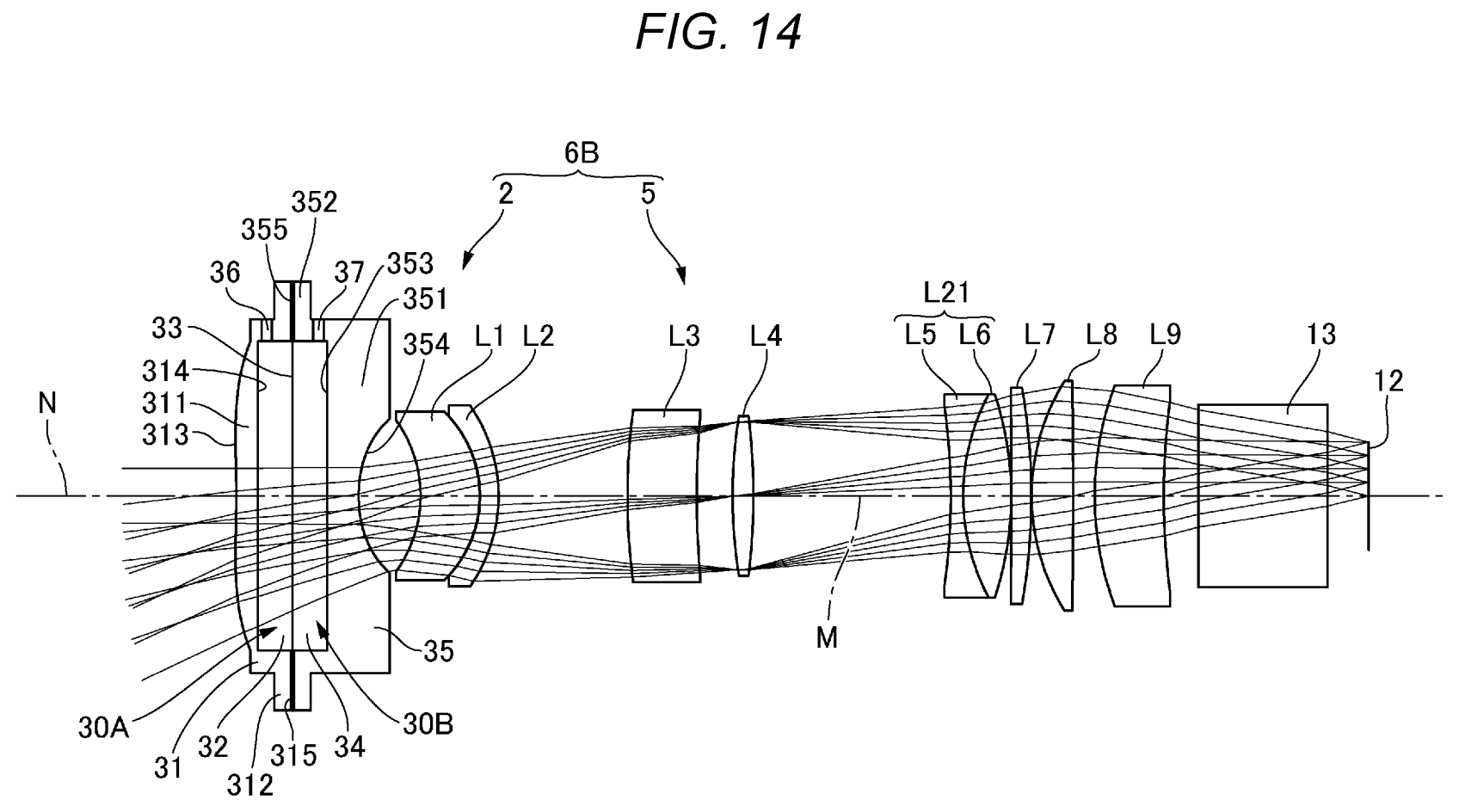

FIG. 14 is a beam diagram showing beams traveling in an optical system 6B according to a third embodiment. The optical system 6B according to the third embodiment is the same as the optical system 6 according to the first embodiment except that the refractive index of the second liquid 34 is greater than the refractive index of the first liquid 32.

Therefore, in the third embodiment, the configurations that are the same as those in the first embodiment have the same reference characters, and the same configurations will not be described in some cases. In FIG. 14, the adjustment mechanism 4 is omitted.

The first liquid 32 fills the first space 30A formed between the second surface 314 and the movable film 33, as shown in FIG. 14. The second liquid 34 fills the second space 30B formed between the movable film 33 and the third surface 353. The first liquid 32 and the second liquid 34 differ from each other in terms of refractive index. In the present embodiment, the refractive index of the second liquid 34 is greater than the refractive index of the first liquid 32.

Data on Lenses of Optical System

Data on the lenses of the optical system 6B are listed below. The surfaces of the lenses are numbered sequentially from the enlargement side toward the reduction side. Reference characters are given to the screen, the variable lens, the lenses, the prism, and the liquid crystal panels. An aspheric surface has a surface number followed by *. R represents the radius of curvature. D represents the axial inter-surface spacing. nd represents the refractive index. νd represents the Abbe number at the d line. Y represents the effective radius. R, D, and Y are each expressed in millimeters.

| Reference character | Surface number | R | D | nd | νd | Mode | Y |
|---|---|---|---|---|---|---|---|
| S | 0 | 0.00000 | Variable spacing 1 | | | Refraction | |
| 31 | *1 | −332.04748 | 6.249111 | 1.50940 | 56.47 | Refraction | 44.000 |
| 32 | 2 | 0.00000 | Variable spacing 2 | 1.33000 | 55.00 | Refraction | 44.000 |
| 33, 34 | 3 | Variable radius of curvature | Variable spacing 3 | 1.42160 | 55.00 | Refraction | 44.000 |
| 35 | 4 | 0.00000 | 9.129166 | 1.50940 | 56.47 | Refraction | 44.000 |
| | *5 | 41.35681 | 17.864425 | | | Refraction | 22.472 |
| L1 | 6 | −39.20574 | 17.076013 | 1.43757 | 94.82 | Refraction | 22.064 |
| | 7 | −35.90550 | 0.140433 | | | Refraction | 23.623 |
| L2 | 8 | −35.49047 | 5.336303 | 1.78685 | 41.26 | Refraction | 23.623 |
| | 9 | −48.13300 | 37.197151 | | | Refraction | 25.385 |
| L3 | 10 | 194.68837 | 20.000000 | 1.86896 | 20.03 | Refraction | 24.136 |
| | 11 | 280.04995 | 10.363116 | | | Refraction | 22.723 |
| L4 | 12 | 155.01914 | 6.000000 | 1.80385 | 46.51 | Refraction | 22.000 |
| | 13 | −201.65251 | 56.971189 | | | Refraction | 22.292 |
| L5 | 14 | −197.02405 | 3.600000 | 1.88495 | 26.27 | Refraction | 26.370 |
| L6 | 15 | 65.84590 | 13.879367 | 1.44777 | 84.58 | Refraction | 27.531 |
| | 16 | −98.53502 | 0.100000 | | | Refraction | 28.621 |
| L7 | 17 | −1625.85676 | 5.716596 | 1.80323 | 46.54 | Refraction | 29.852 |
| | 18 | −195.33105 | 0.100000 | | | Refraction | 30.467 |
| L8 | 19 | 66.29241 | 12.000000 | 1.45375 | 83.76 | Refraction | 32.460 |
| | 20 | −2023.37423 | 6.163442 | | | Refraction | 32.271 |
| L9 | 21 | 95.46661 | 20.000000 | 1.79758 | 46.74 | Refraction | 31.196 |
| | 22 | 227.99267 | 10.000000 | | | Refraction | 27.858 |
| 13 | 23 | 0.00000 | 37.300000 | 1.51680 | 64.17 | Refraction | 25.631 |
| | 24 | 0.00000 | 11.800000 | | | Refraction | 19.163 |
| 12 | 25 | 0.00000 | 0.000000 | | | Refraction | 16.002 |

Figure 15:
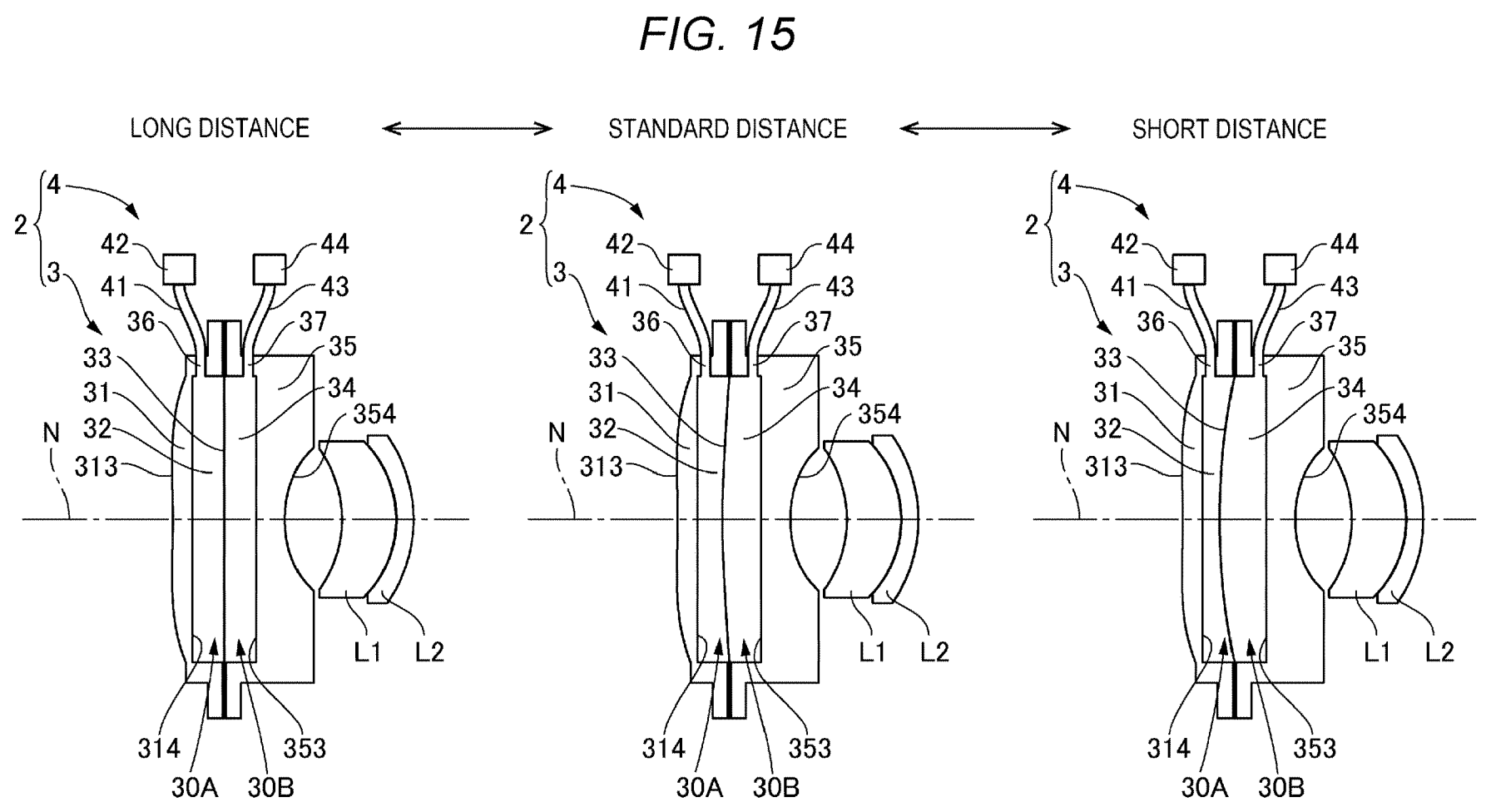

The optical system 6B has a changeable projection distance selected from the standard distance, the short distance shorter than the standard distance, and the long distance longer than the standard distance. When the projection distance is changed, focusing is performed by changing the focal length of the variable lens 3. FIG. 15 is a schematic view showing the changes in the focal length of the variable lens 3. When the projection distance is the standard distance, the pressure of the second liquid 34 is adjusted by the adjustment mechanism 4 to be greater than the pressure of the first liquid 32 in the variable lens 3, so that the movable film 33 has a convex shape curved toward the enlargement side, as shown in FIG. 15.

When the projection distance is the short distance, the pressure of the second liquid 34 is adjusted by the adjustment mechanism 4 to be further greater than the pressure of the first liquid 32 in the variable lens 3, so that the movable film 33 has a convex shape curved by a greater amount toward the enlargement side. At this point, the focal length of the variable lens 3 is shorter than that achieved when the projection distance is the standard distance. That is, the power of the variable lens 3 increases.

When the projection distance is the long distance, the pressure of the first liquid 32 and the pressure of the second liquid 34 are adjusted by the adjustment mechanism 4 to be equal to each other in the variable lens 3, so that the movable film 33 has a planar shape that is not curved. At this point, the focal length of the variable lens 3 is longer than that achieved when the projection distance is the standard distance. That is, the power of the variable lens 3 decreases. The absolute value of the radius of curvature of the curved movable film 33 therefore decreases as the projection distance increases.

The table below shows the variable spacings 1, 2, and 3, and the variable radius of curvature at each of the projection distances where the focusing is performed. The variable spacing 1 is the projection distance. The variable spacing 2 is the axial inter-surface spacing between the second surface 314 of the first substrate 31 and the movable film 33, that is, the axial thickness of the first liquid 32. The variable spacing 3 is the axial inter-surface spacing between the movable film 33 and the third surface 353 of the second substrate 35, that is, the axial thickness of the second liquid 34. The variable radius of curvature is the radius of the curvature of the movable film 33.

| | Standard distance | Short distance | Long distance |
|---|---|---|---|
| Variable spacing 1 | 4000.000000 | 2000.000000 | 20000.000000 |
| Variable spacing 2 | 7.935770 | 5.181414 | 10.000000 |
| Variable spacing 3 | 12.064230 | 14.818586 | 10.000000 |
| Variable radius of curvature | 469.97219 | 203.29809 | Infinity |

The aspheric coefficients are listed below.

| | Surface number | |
|---|---|---|
| | 1 | 5 |
| Conic constant | 1.043068E+00 | −1.7038E+00 |
| Fourth-order coefficient | 2.893868E−06 | 8.712047E−06 |
| Sixth-order coefficient | −1.159359E−09 | 2.264682E−09 |
| Eighth-order coefficient | 4.03658E−13 | −3.620397E−12 |
| Tenth-order coefficient | −6.141651E−17 | 9.934457E−15 |

Effects and Advantages

Even when the refractive index of the second liquid 34 is greater than that of the first liquid 32, as in the present embodiment, the optical system 6B according to the present embodiment can provide the effects and advantages that are the same as those provided by the first embodiment.

Figure 16:
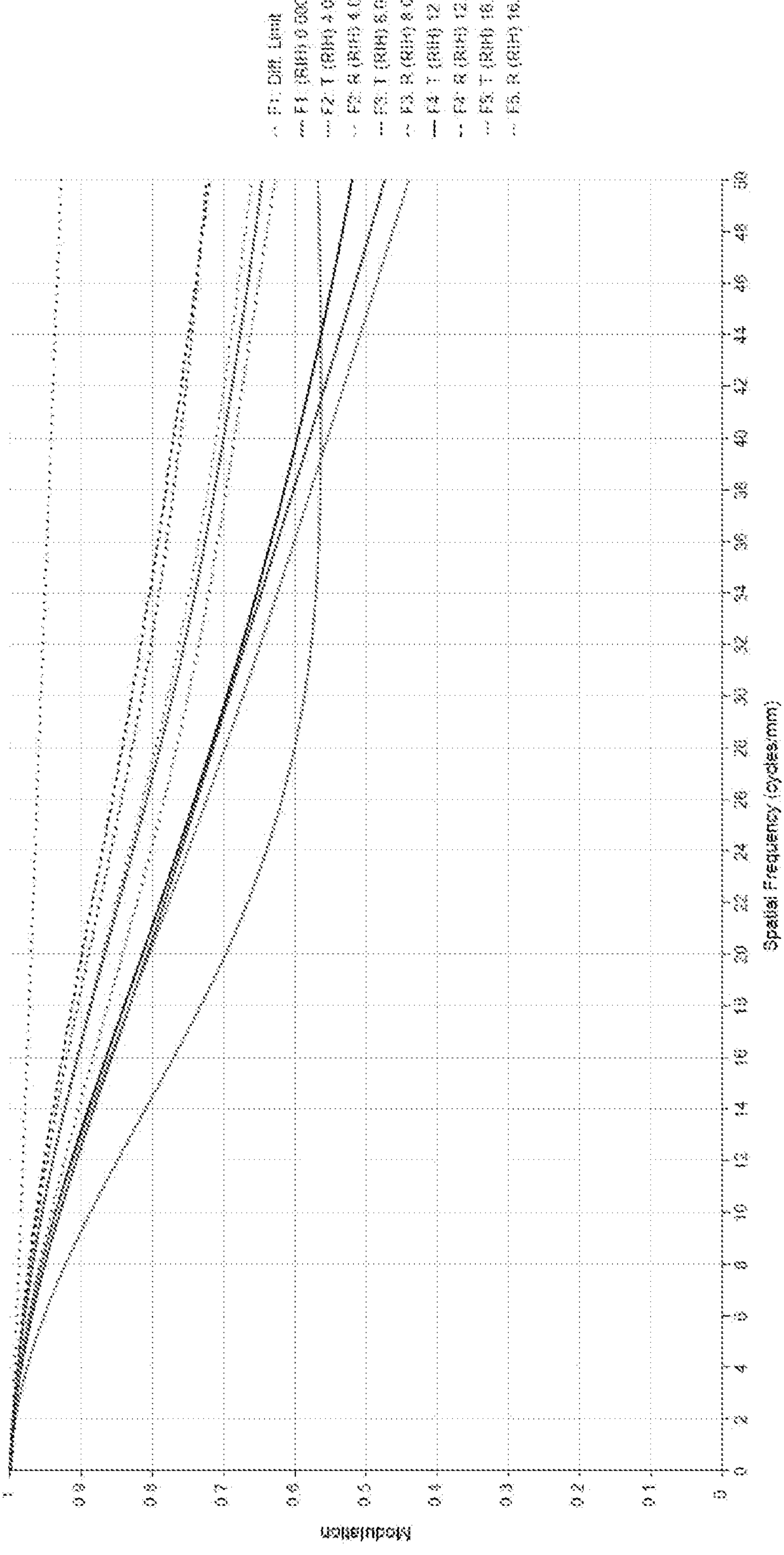
FIG. 16 shows the MTF of the optical system set at the standard distance in the third embodiment.
Figure 18:
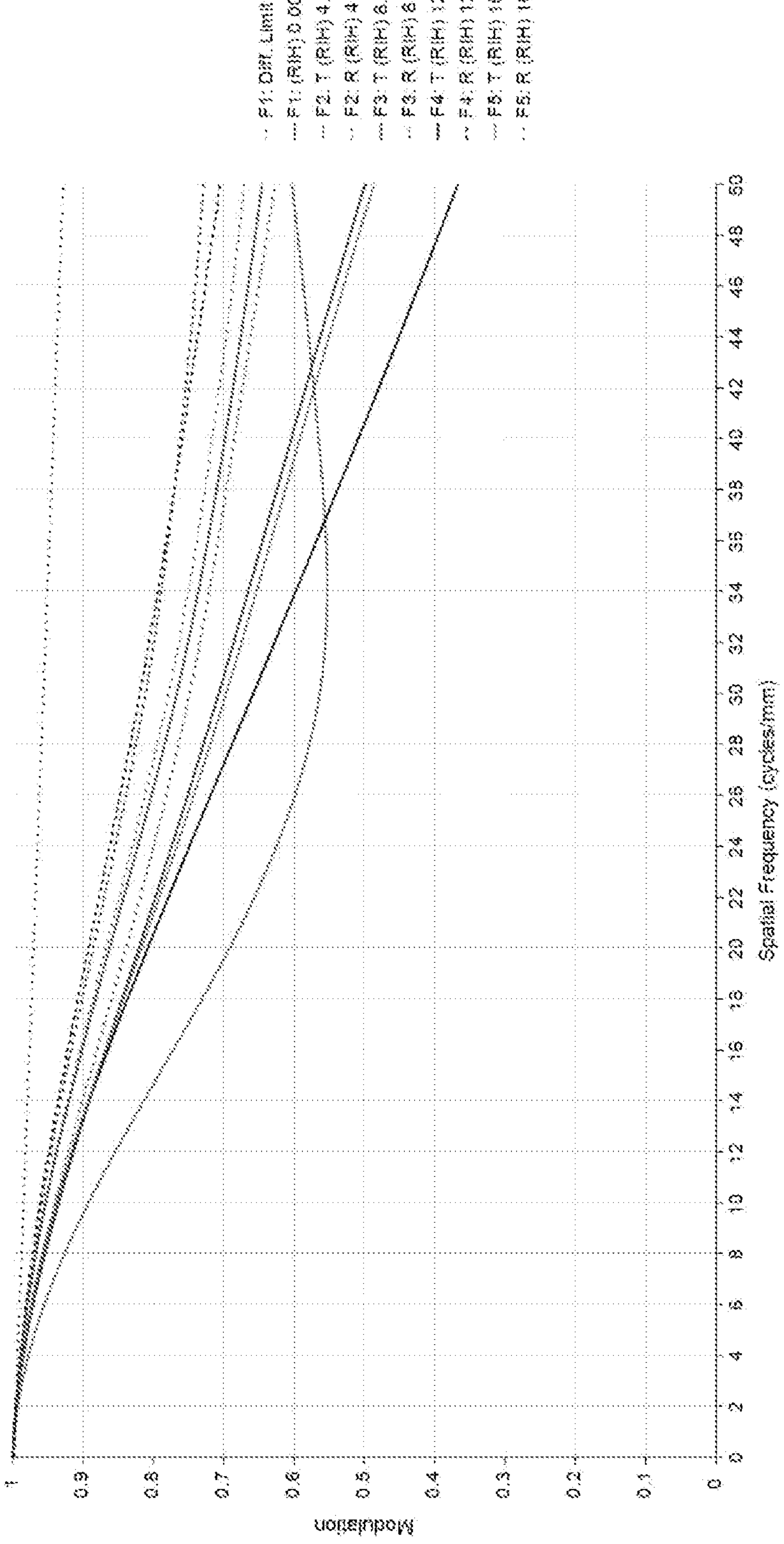
FIG. 18 shows the MTF of the optical system set at the long distance in the third embodiment.

FIG. 16 shows the MTF of the optical system 6B set at the standard distance. FIG. 17 shows the MTF of the optical system 6B set at the short distance. FIG. 18 shows the MTF of the optical system 6B set at the long distance. The optical system 6B according to the present embodiment provides high resolution, as shown in FIGS. 16 to 18, as in the first embodiment.

Fourth Embodiment

Figure 19:
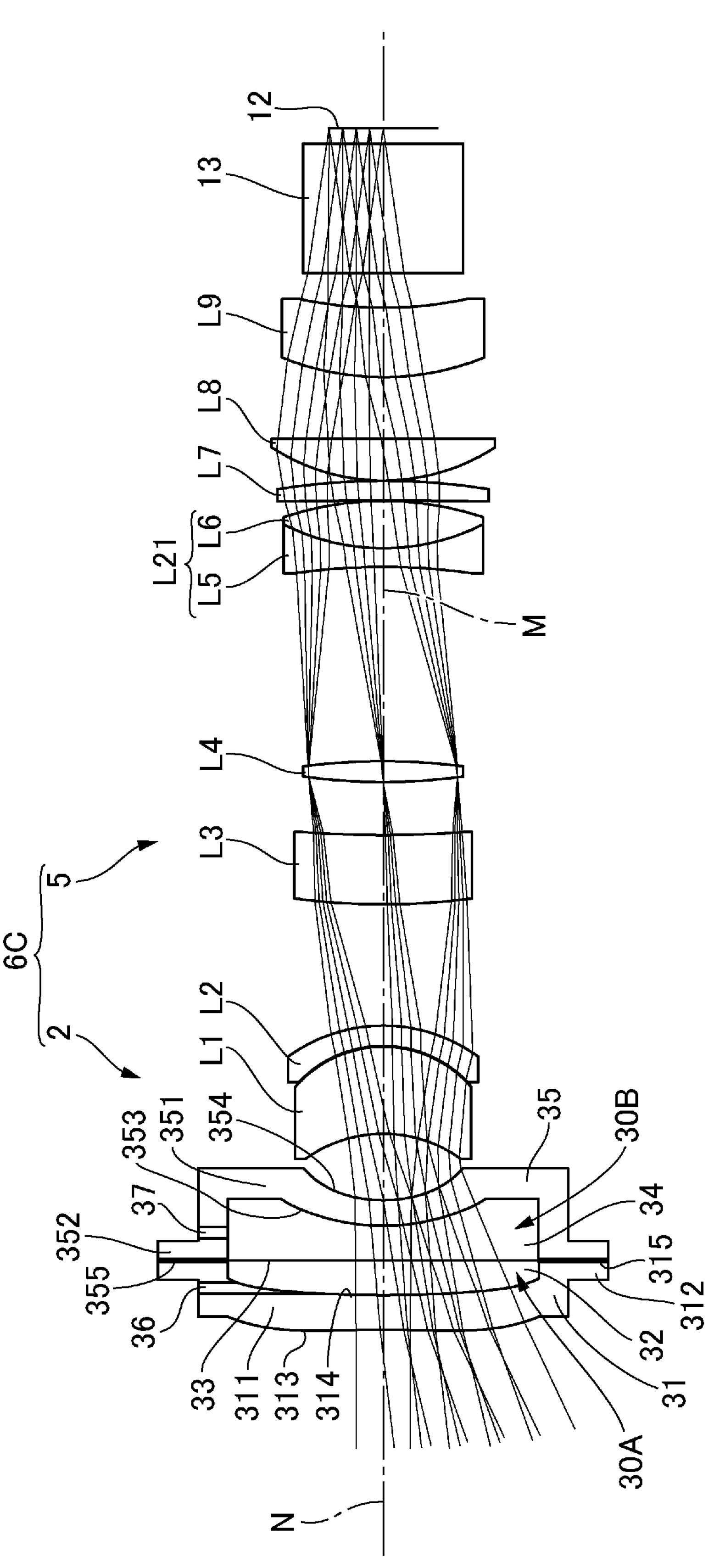
FIG. 19 is a beam diagram showing beams traveling in the optical system according to a fourth embodiment.

FIG. 19 is a beam diagram showing beams traveling in an optical system 6C according to a fourth embodiment. The optical system 6C according to the fourth embodiment is the same as the optical system 6A according to the second embodiment except that the refractive index of the second liquid 34 is greater than the refractive index of the first liquid 32. Therefore, in the fourth embodiment, the configurations that are the same as those in the second embodiment have the same reference characters, and the same configurations will not be described in some cases. In FIG. 19, the adjustment mechanism 4 is omitted.

The first liquid 32 fills the first space 30A formed between the second surface 314 and the movable film 33, as shown in FIG. 19. The second liquid 34 fills the second space 30B formed between the movable film 33 and the third surface 353. The first liquid 32 and the second liquid 34 differ from each other in terms of refractive index. In the present embodiment, the refractive index of the second liquid 34 is greater than the refractive index of the first liquid 32.

Data on Lenses of Optical System

Data on the lenses of the optical system 6C are listed below. The surfaces of the lenses are numbered sequentially from the enlargement side toward the reduction side. Reference characters are given to the screen, the variable lens, the lenses, the prism, and the liquid crystal panels. An aspheric surface has a surface number followed by *. R represents the radius of curvature. D represents the axial inter-surface spacing. nd represents the refractive index. νd represents the Abbe number at the d line. Y represents the effective radius. R, D, and Y are each expressed in millimeters.

| Reference character | Surface number | R | D | nd | νd | Mode | Y |
|---|---|---|---|---|---|---|---|
| S | 0 | 0.00000 | Variable spacing 1 | | | Refraction | |
| 31 | *1 | −268.82075 | 9.915981 | 1.48573 | 77.34 | Refraction | 44.000 |

-continued

| Reference character | Surface number | R | D | nd | vd | Mode | Y |
|---|---|---|---|---|---|---|---|
| 32 | *2 | 367.99736 | Variable spacing 2 | 1.33000 | 55.00 | Refraction | 44.000 |
| 33, 34 | 3 | Variable radius of curvature | Variable spacing 3 | 1.42160 | 55.00 | Refraction | 44.000 |
| 35 | *4 | 62.91245 | 7.398931 | 1.50856 | 53.74 | Refraction | 44.000 |
| | *5 | 42.83256 | 19.170375 | | | Refraction | 23.114 |
| L1 | 6 | −40.00000 | 25.120179 | 1.43700 | 95.10 | Refraction | 22.512 |
| | 7 | −34.99237 | 0.220207 | | | Refraction | 24.609 |
| L2 | 8 | −35.01356 | 5.841252 | 1.82188 | 44.32 | Refraction | 24.471 |
| | 9 | −48.80877 | 35.003957 | | | Refraction | 26.540 |
| L3 | 10 | 203.33257 | 20.000000 | 1.85458 | 20.30 | Refraction | 24.824 |
| | 11 | 330.68172 | 15.281067 | | | Refraction | 23.326 |
| L4 | 12 | 175.10075 | 6.000000 | 1.79048 | 47.00 | Refraction | 22.000 |
| | 13 | −191.02377 | 56.048052 | | | Refraction | 22.283 |
| L5 | 14 | −188.02861 | 5.423318 | 1.88497 | 26.17 | Refraction | 25.621 |
| L6 | 15 | 67.11981 | 13.575966 | 1.44582 | 85.07 | Refraction | 26.854 |
| | 16 | −95.64059 | 0.100000 | | | Refraction | 27.936 |
| L7 | 17 | −1798.09470 | 5.738311 | 1.79933 | 46.68 | Refraction | 29.049 |
| | 18 | −203.27176 | 0.100000 | | | Refraction | 29.644 |
| L8 | 19 | 62.08628 | 12.000000 | 1.47256 | 81.13 | Refraction | 31.417 |
| | 20 | −15972.31050 | 17.801884 | | | Refraction | 31.134 |
| L9 | 21 | 82.09144 | 20.000000 | 1.85241 | 41.18 | Refraction | 28.326 |
| | 22 | 122.70554 | 10.000000 | | | Refraction | 24.272 |
| 13 | 23 | 0.00000 | 37.300000 | 1.51680 | 64.17 | Refraction | 22.298 |
| | 24 | 0.00000 | 0.100036 | | | Refraction | 16.018 |
| 12 | 25 | 0.00000 | 0.000000 | | | Refraction | 16.008 |

Figure 20:
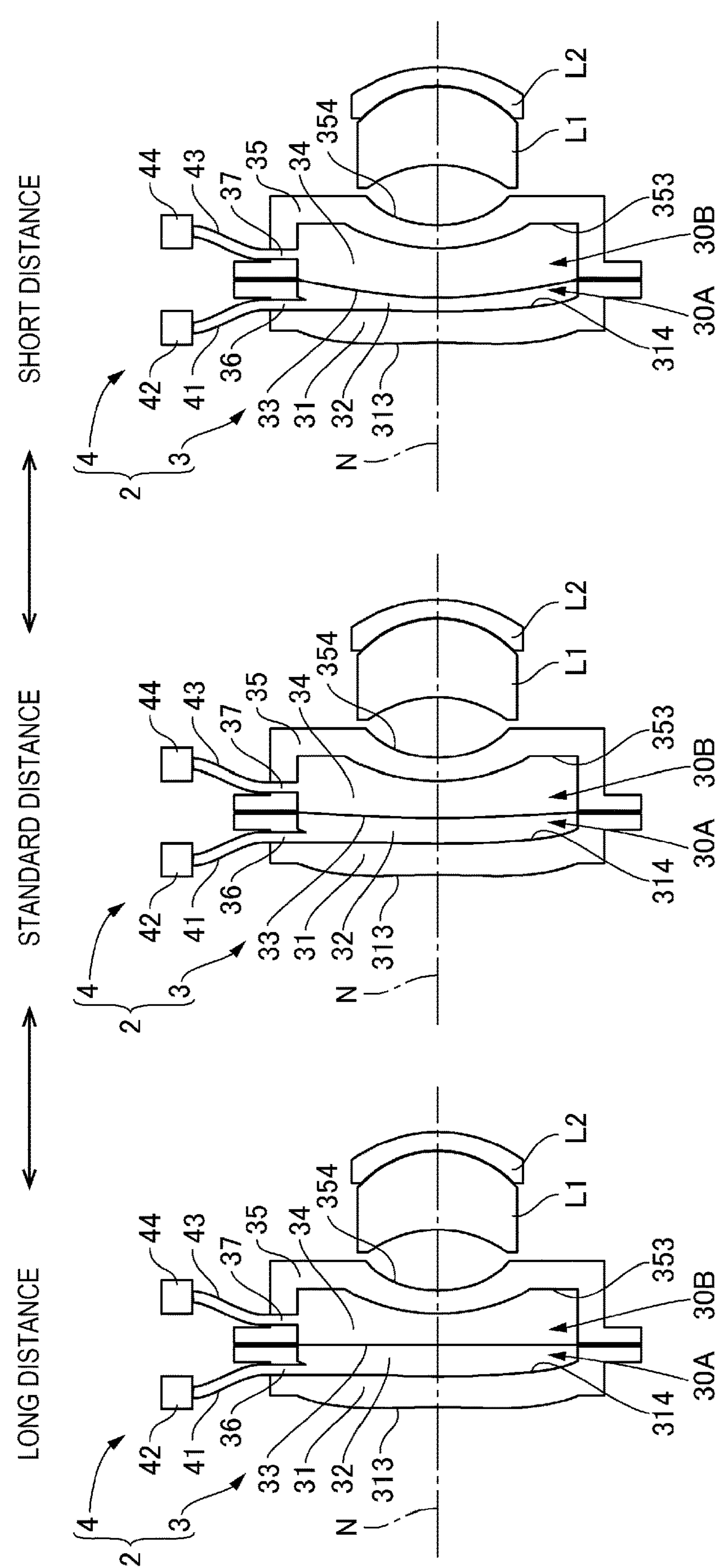
FIG. 20 is a schematic view showing the changes in the focal length of the variable lens in the fourth embodiment.

The optical system 6C has a changeable projection distance selected from the standard distance, the short distance shorter than the standard distance, and the long distance longer than the standard distance. When the projection distance is changed, focusing is performed by changing the focal length of the variable lens 3. FIG. 20 is a schematic view showing the changes in the focal length of the variable lens 3. When the projection distance is the standard distance, the pressure of the second liquid 34 is adjusted by the adjustment mechanism 4 to be greater than the pressure of the first liquid 32 in the variable lens 3, so that the movable film 33 has a convex shape curved toward the enlargement side, as shown in FIG. 20.

When the projection distance is the short distance, the pressure of the second liquid 34 is adjusted by the adjustment mechanism 4 to be further greater than the pressure of the first liquid 32 in the variable lens 3, so that the movable film 33 has a convex shape curved by a greater amount toward the enlargement side. At this point, the focal length of the variable lens 3 is shorter than that achieved when the projection distance is the standard distance. That is, the power of the variable lens 3 increases.

When the projection distance is the long distance, the pressure of the first liquid 32 and the pressure of the second liquid 34 are adjusted by the adjustment mechanism 4 to be equal to each other in the variable lens 3, so that the movable film 33 has a planar shape that is not curved. At this point, the focal length of the variable lens 3 is longer than that achieved when the projection distance is the standard distance. That is, the power of the variable lens 3 decreases. The absolute value of the radius of curvature of the curved movable film 33 therefore decreases as the projection distance increases.

The table below shows the variable spacings 1, 2, and 3, and the variable radius of curvature at each of the projection distances where the focusing is performed. The variable spacing 1 is the projection distance. The variable spacing 2 is the axial inter-surface spacing between the second surface 314 of the first substrate 31 and the movable film 33, that is, the axial thickness of the first liquid 32. The variable spacing 3 is the axial inter-surface spacing between the movable film 33 and the third surface 353 of the second substrate 35, that is, the axial thickness of the second liquid 34. The variable radius of curvature is the radius of the curvature of the movable film 33.

| | Standard distance | Short distance | Long distance |
|---|---|---|---|
| Variable spacing 1 | 4000.000000 | 2000.000000 | 20000.000000 |
| Variable spacing 2 | 7.845638 | 5.103056 | 10.000000 |
| Variable spacing 3 | 12.154362 | 14.896944 | 10.000000 |
| Variable radius of curvature | 450.39813 | 200.12276 | Infinity |

| The aspheric coefficients are listed below. | | | | |
|---|---|---|---|---|
| | Surface number | | | |
| | 1 | 2 | 4 | 5 |
| Conic constant | 5.304177E+00 | −1.397295E+00 | −1.295239E+00 | −1.867743E+00 |
| Fourth-order coefficient | 2.959993E−06 | 1.509083E−08 | 5.628564E−07 | 8.443247E−06 |
| Sixth-order coefficient | −1.170127E−09 | 4.738863E−11 | −1.208885E−09 | 1.68065E−09 |
| Eighth-order coefficient | 4.013149E−13 | −2.527007E−14 | 2.849717E−13 | −3.761454E−12 |
| Tenth-order coefficient | −5.656545E−17 | 4.56503E−17 | 1.363324E−15 | 9.684354E−15 |

Effects and Advantages

Even when the refractive index of the second liquid 34 is greater than that of the first liquid 32, as in the present embodiment, the optical system 6C according to the present embodiment can provide the effects and advantages that are the same as those provided by the second embodiment.

Figure 21:
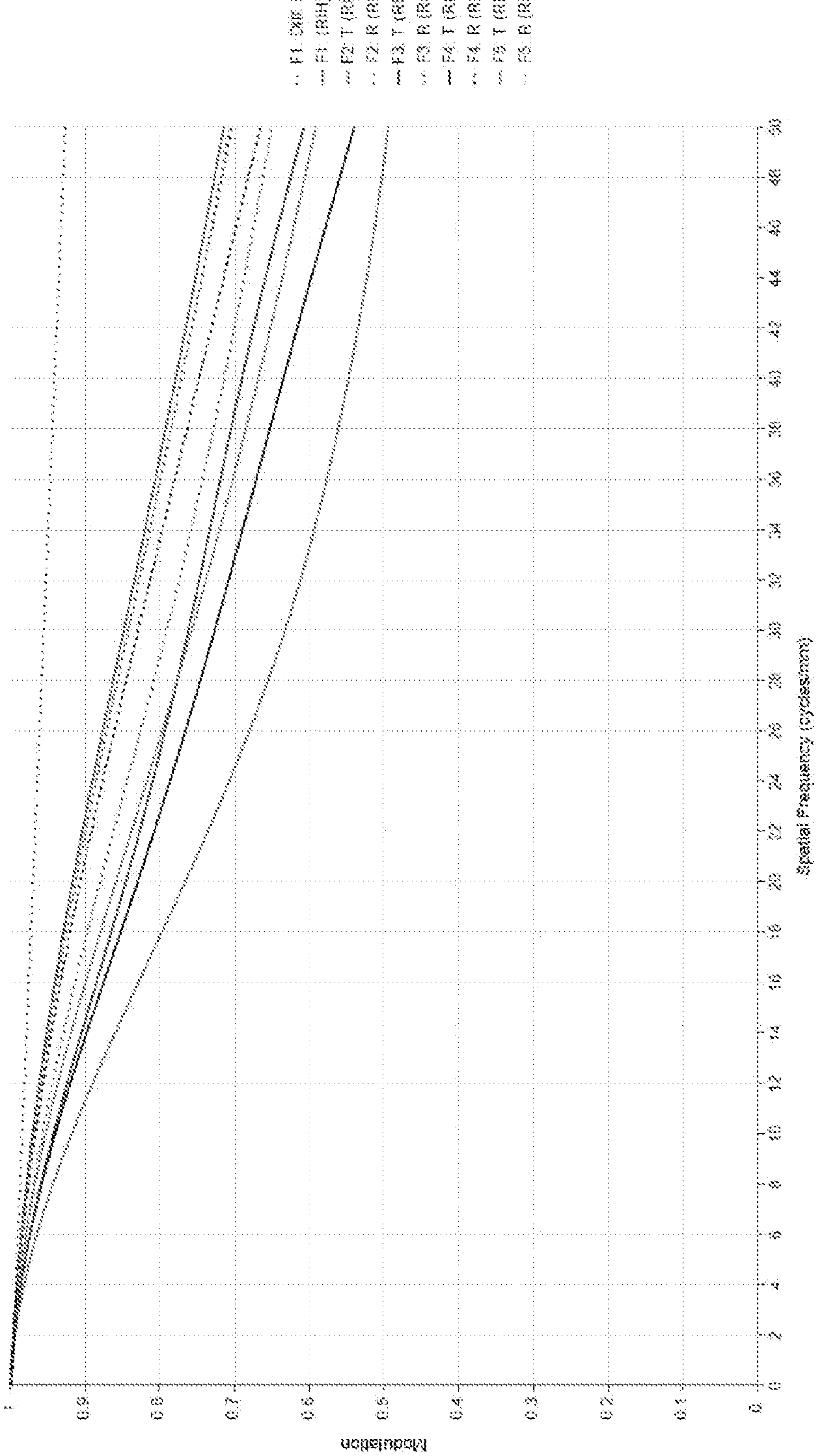
FIG. 21 shows the MTF of the optical system set at the standard distance in the fourth embodiment.
Figure 22:
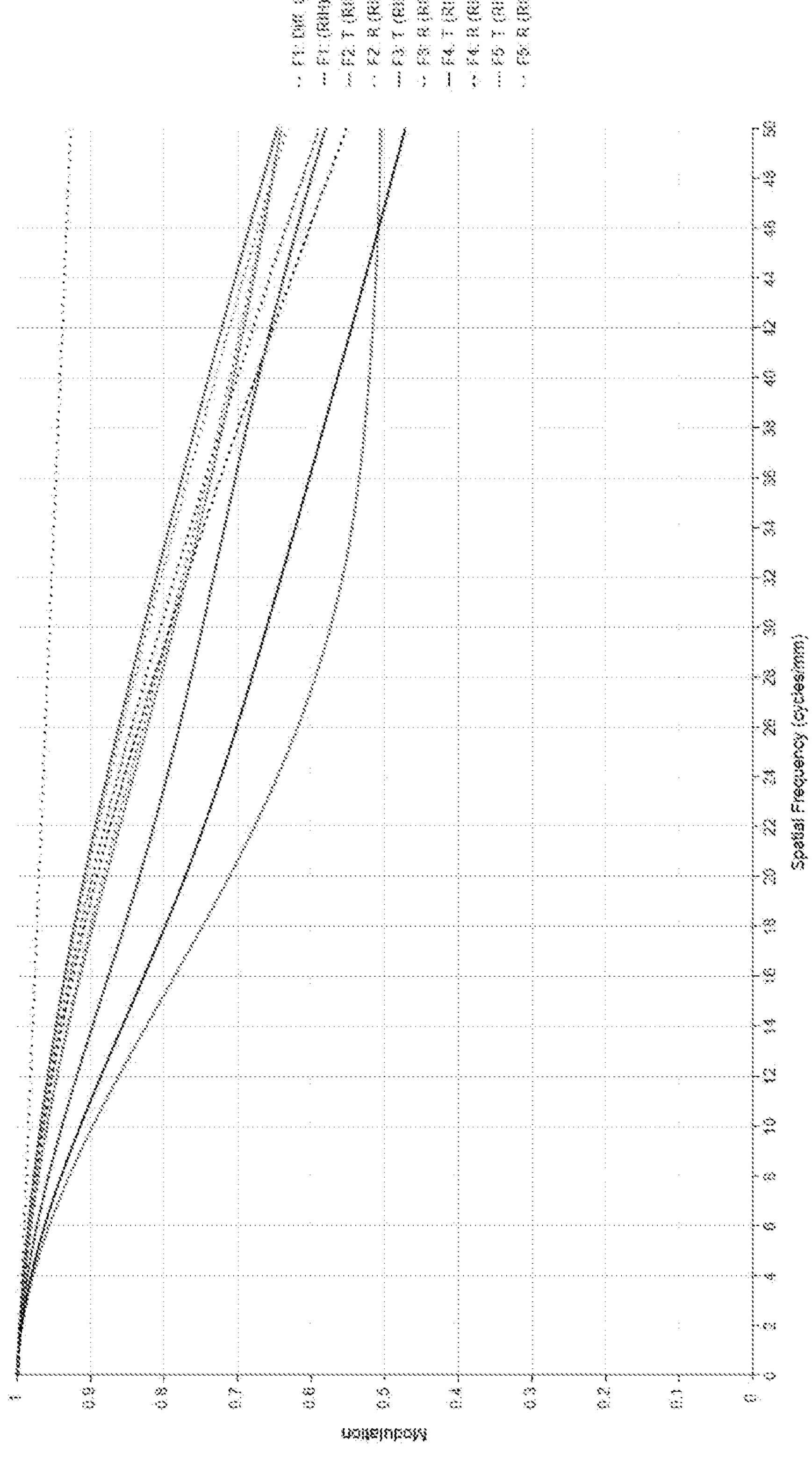
FIG. 22 shows the MTF of the optical system set at the short distance in the fourth embodiment.
Figure 23:
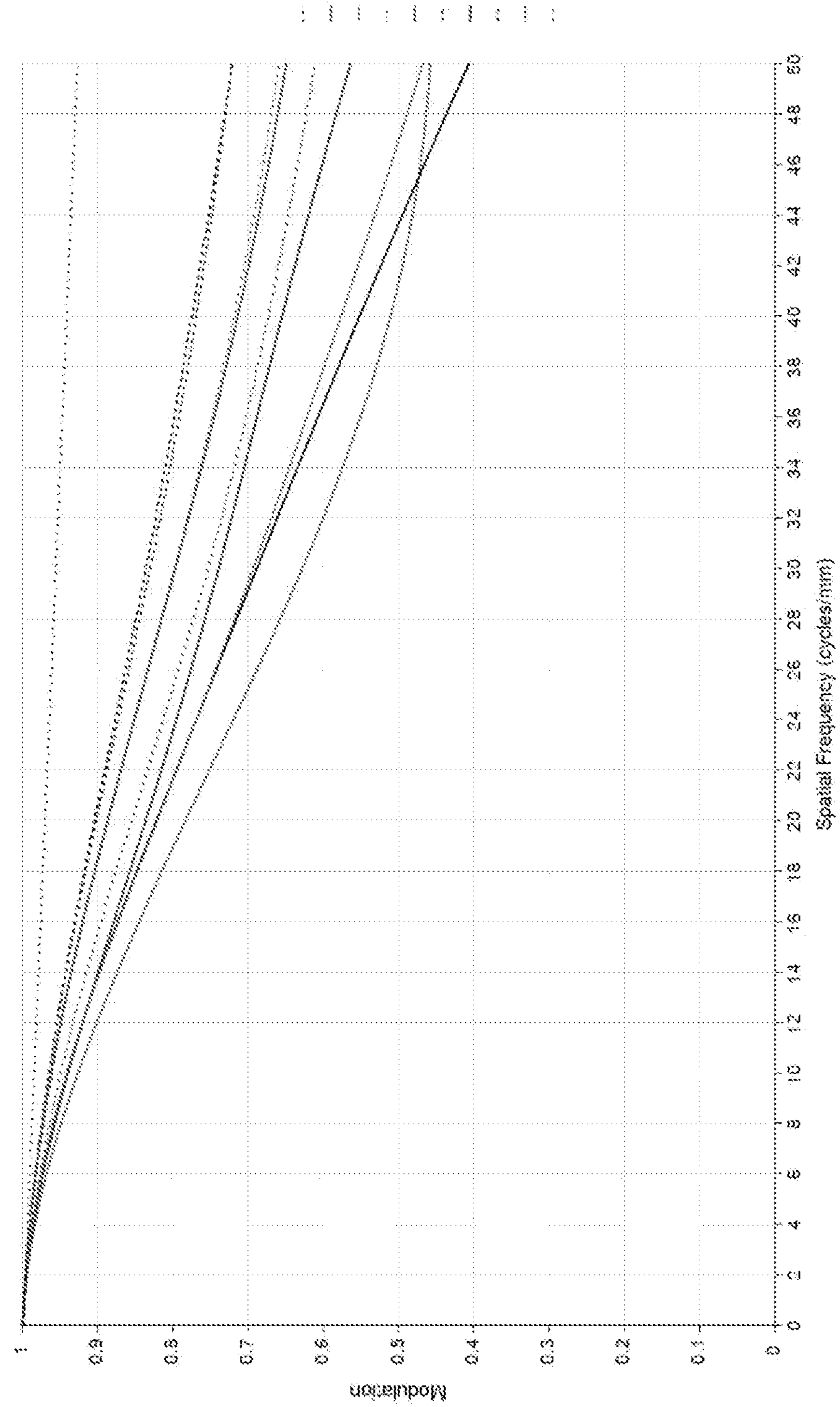
FIG. 23 shows the MTF of the optical system set at the long distance in the fourth embodiment.

FIG. 21 shows the MTF of the optical system 6C set at the standard distance. FIG. 22 shows the MTF of the optical system 6C set at the short distance. FIG. 23 shows the MTF of the optical system 6C set at the long distance. The optical system 6C according to the present embodiment provides high resolution, as shown in FIGS. 21 to 23, as in the second embodiment.

Other Embodiments

In the embodiments described above, the projector 100 includes the variable lens 3 and the adjustment mechanism 4 as the variable lens unit 2, but may not include the adjustment mechanism 4. That is, the projector 100 may include only the variable lens 3. In this case, when the variable lens 3 is manufactured or otherwise processed, the pressures of the first liquid 32 and the second liquid 34 are adjusted to adjust the focal length of the variable lens 3, and the first communication port 36 and the second communication port 37 are then blocked.

In the embodiments described above, the first substrate 31 and the second substrate 35 each have power as a lens, but not necessarily. At least one of the first substrate 31 and the second substrate 35 may have power as a lens. In this case, the substrate having no power as a lens has planar surfaces at the enlargement and reduction sides. Even the configuration described above allows the substrate having power as a lens to satisfactorily correct the variety of aberrations produced by the variable lens 3.

In the embodiments described above, the first substrate 31 and the second substrate 35 each have an aspheric shape, but may not each have an aspheric shape.

Imaging Apparatus

Figure 24:
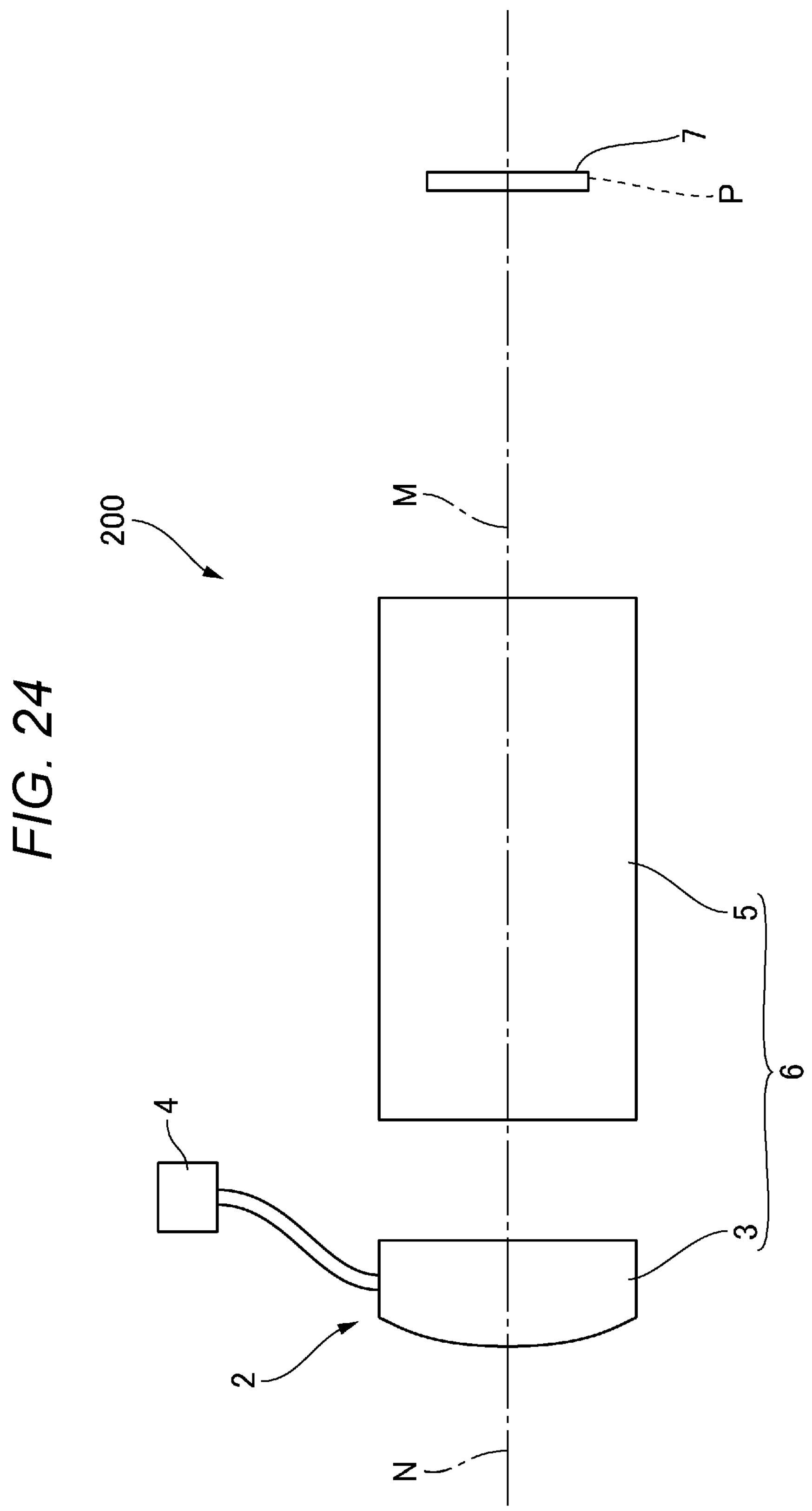
FIG. 24 describes an imaging apparatus according to an embodiment of the present disclosure.

The optical system 6 described above can be used in an imaging apparatus 200. FIG. 24 describes the imaging apparatus 200 including the optical system 6 according to the present embodiment. The imaging apparatus 200 includes the variable lens unit 2, the first optical system 5, and an imaging device 7. The variable lens 3 and the first optical system 5 constitute the optical system 6 of the imaging apparatus 200. The variable lens 3 and the first optical system 5 are sequentially arranged in the direction in which the beam passes from the enlargement side toward the reduction side. The variable lens 3 is disposed at a position closest to the enlargement side in the optical system 6. The imaging device 7 is disposed in the reduction-side conjugate plane P. Even the configuration in which the optical system 6 described above is used in the imaging apparatus 200 can provide the effects and advantages that are the same as those provided by the configuration in which the optical system 6 described above is used in the projector 100.

Summary of Present Disclosure

The present disclosure will be summarized below as additional remarks.

Additional Remark 1

A variable lens including a first substrate that is light transmissive, a first liquid, a movable film that is in contact with the first liquid and is light transmissive and elastically deformable, a second liquid in contact with the movable film, and a second substrate that is light transmissive, the substrates, the film, and the liquids sequentially arranged in the direction in which a beam passes along an optical axis, the first and second liquids being different from each other in terms of refractive index, the pressures of the first and second liquids adjusted to cause the movable film to curve in the direction along the optical axis, and at least one of the first and second substrates having power as a lens.

The distances from the movable film to the first and second substrates can thus be reduced, so that the first or second substrate that has power as a lens can satisfactorily correct the variety of aberrations produced by the variable lens. The variable lens, which does not require another lens for correcting the variety of aberrations produced by the variable lens, allows reduction in the size of the optical system including the variable lens.

Additional Remark 2

The variable lens described in the additional remark 1, in which at least one of the first and second substrates is made of a resin material.

The first and second substrates are therefore each readily provided with a lens surface.

Additional Remark 3

The variable lens described in the additional remark 1 or 2, in which the first substrate has a first surface that faces the side opposite from the second substrate, a second surface that faces the second substrate, and a first flange surface that surrounds the outer circumference of the second surface and is shifted from the second surface toward the second substrate, the second substrate has a third surface that faces the first substrate, a fourth surface that faces the side opposite from the first substrate, and a second flange surface that surrounds the outer circumference of the third surface and is shifted from the third surface toward the first substrate, the movable film is so fixed that an outer circumferential portion thereof is provided between the first and second flange surfaces, the first liquid fills a first space formed between the second surface and the movable film, and the second liquid fills a second space formed between the movable film and the third surface.

The variable lens can thus be formed as a single unit with the first substrate and the first liquid being in contact with each other and the second liquid and the second substrate being in contact with each other.

Additional Remark 4

The variable lens described in the additional remark 3, in which the first and second substrates each have power as a lens.

The variety of aberrations produced by the variable lens can therefore be more satisfactorily corrected.

Additional Remark 5

The variable lens described in the additional remark 4, in which the first and fourth surfaces each have an aspheric shape.

The variety of aberrations produced by the variable lens can therefore be more satisfactorily corrected.

Additional Remark 6

The variable lens described in the additional remark 5, in which at least one of the second and third surfaces has an aspheric shape.

The variety of aberrations produced by the variable lens can therefore be more satisfactorily corrected.

Additional Remark 7

A variable lens unit including the variable lens described in any one of the additional remarks 3 to 6, and an adjustment mechanism that changes the focal length of the variable lens, the variable lens having a first communication port that communicates with the first space, and a second communication port that communicates with the second space, and the adjustment mechanism adjusts the pressure of the first liquid injected into the first space via the first communication port and adjusts the pressure of the second liquid injected into the second space via the second communication port.

The focal length of the variable lens can thus be readily changed.

Additional Remark 8

An optical system including the variable lens described in any one of the additional remarks 1 to 6, and a first optical system, the two optical systems sequentially arranged from the enlargement side toward the reduction side in the direction in which a beam passes, the variable lens disposed at a position closest to the enlargement side.

The projection distance of the optical system can therefore be readily changed by changing the focal length of the variable lens. Since a luminous flux passing through the variable lens at each image height diverges, the variety of aberrations produced by the first optical system are readily corrected by the aspheric shape.

Additional Remark 9

The optical system described in the additional remark 8, in which the absolute value of the radius of curvature of the curved movable film decreases as the projection distance of the optical system increases.

When the optical system is used in a region where the projection distance is long, the focal length of the variable lens is so long that the amount of curvature of the movable film can be reduced. A smaller pressure thus acts on the movable film, so that the reliability of the movable film can be improved.

Additional Remark 10

A projector including the optical system described in the additional remark 8 or 9, and an image formation section that forms a projection image in the reduction-side conjugate plane of the optical system, the image formation section including a light source and a light modulator that modulates the beam from the light source.

The thus configured projector includes a compact optical system and can satisfactorily correct the variety of aberrations.

Additional Remark 11

An imaging apparatus including the optical system described in the additional remark 8 or 9, and an imaging device disposed in the reduction-side conjugate plane of the optical system.

The thus configured imaging apparatus includes a compact optical system and can satisfactorily correct the variety of aberrations.

What is claimed is:

1. A variable lens comprising:

a first substrate that is light transmissive;

a first liquid;

a movable film that is in contact with the first liquid and is light transmissive and elastically deformable;

a second liquid in contact with the movable film; and a second substrate that is light transmissive, the first substrate, the first liquid, the film, the second liquid and the second substrate being sequentially arranged in a direction in which a beam passes along an optical axis, wherein the first liquid and the second liquid differ from each other in terms of refractive index, pressures of the first liquid and the second liquid are adjusted to cause the movable film to curve in a direction along the optical axis, at least one of the first substrate and the second substrate has power as a lens, the first substrate has a first surface that faces a side opposite from the second substrate, a second surface that faces the second substrate, and a first flange surface that surrounds an outer circumference of the second surface and is shifted from the second surface toward the second substrate, the second substrate has a third surface that faces the first substrate, a fourth surface that faces a side opposite from the first substrate, and a second flange surface that surrounds an outer circumference of the third surface and is shifted from the third surface toward the first substrate, the movable film is so fixed that an outer circumferential portion thereof is provided between the first surface and the second flange surface, the first liquid fills a first space formed between the second surface and the movable film, and the second liquid fills a second space formed between the movable film and the third surface.

2. The variable lens according to claim 1, wherein at least one of the first substrate and the second substrate is made of a resin material.

3. The variable lens according to claim 1, wherein the first substrate and the second substrate each have power as a lens.

4. The variable lens according to claim 3, wherein the first surface and the fourth surface each have an aspheric shape.

5. The variable lens according to claim 4, wherein at least one of the second surface and the third surface has an aspheric shape.

6. A variable lens unit comprising:

the variable lens according to claim 1; and an adjustment mechanism that changes a focal length of the variable lens, wherein the variable lens has a first communication port that communicates with the first space, and a second communication port that communicates with the second space, and the adjustment mechanism adjusts the pressure of the first liquid injected into the first space via the first communication port and adjusts the pressure of the second liquid injected into the second space via the second communication port.

7. An optical system comprising:

the variable lens according to claim 1; and a first optical system, the variable lens and the first optical system being sequentially arranged from an enlargement side toward a reduction side in a direction in which a beam passes, wherein the variable lens disposed at a position closest to the enlargement side.

8. The optical system according to claim 7, wherein an absolute value of a radius of curvature of the curved movable film decreases as a projection distance of the optical system increases.

9. A projector comprising:

the optical system according to claim 7; and an image formation section that forms a projection image in a reduction-side conjugate plane of the optical system, wherein the image formation section includes a light source and a light modulator that modulates a beam from the light source.

10. An imaging apparatus comprising:

the optical system according to claim 7; and an imaging device disposed in a reduction-side conjugate plane of the optical system.

* * * * *